(12) United States Patent
Fuchs et al.

(10) Patent No.: US 12,444,425 B2
(45) Date of Patent: Oct. 14, 2025

(54) AUDIO DECODER, APPARATUS FOR DETERMINING A SET OF VALUES DEFINING CHARACTERISTICS OF A FILTER, METHODS FOR PROVIDING A DECODED AUDIO REPRESENTATION, METHODS FOR DETERMINING A SET OF VALUES DEFINING CHARACTERISTICS OF A FILTER AND COMPUTER PROGRAM

(71) Applicant: Fraunhofer-Gesellschaft zur Foerderung der angewandten Forschung e.V., Munich (DE)

(72) Inventors: Guillaume Fuchs, Erlangen (DE); Srikanth Korse, Erlangen (DE); Emmanuel Ravelli, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 209 days.

(21) Appl. No.: 17/496,560

(22) Filed: Oct. 7, 2021

(65) Prior Publication Data
US 2022/0223161 A1    Jul. 14, 2022

Related U.S. Application Data

(63) Continuation of application No. PCT/EP2020/060148, filed on Apr. 9, 2020.

(51) Int. Cl.
*G10L 19/02* (2013.01)
*G06N 3/048* (2023.01)
(Continued)

(52) U.S. Cl.
CPC .............. *G10L 19/02* (2013.01); *G06N 3/048* (2023.01); *G06N 3/08* (2013.01); *G10L 21/0316* (2013.01)

(58) Field of Classification Search
None
See application file for complete search history.

(56) References Cited

U.S. PATENT DOCUMENTS

| 5,185,848 A | 2/1993 | Aritsuka et al. |
| 8,397,117 B2 | 3/2013 | Laaksonen et al. |
| (Continued) | | |

FOREIGN PATENT DOCUMENTS

| CN | 102089808 A | 6/2011 |
| CN | 102105930 A | 6/2011 |
| (Continued) | | |

OTHER PUBLICATIONS

"Method for the subjective assessment of intermediate quality levels of coding systems", Recommendation BS.1534-1, ITU-R, 2003, 2003, 18 pp.

(Continued)

*Primary Examiner* — Hemant S Patel
(74) *Attorney, Agent, or Firm* — Perkins Coie LLP; Michael A. Glenn

(57) ABSTRACT

An audio decoder for providing a decoded audio representation on the basis of an encoded audio representation includes a filter for providing an enhanced audio representation of the decoded audio representation. The filter is configured to obtain a plurality of scaling values, which are associated with different frequency bins or frequency ranges, on the basis of spectral values of the decoded audio representation which are associated with different frequency bins or frequency ranges, and the filter is configured to scale spectral values of the decoded audio signal representation, or a pre-processed version thereof, using the scaling values, to obtain the enhanced audio representation. An apparatus for determining a set of values defining characteristics of a filter (Continued)

for providing an enhanced audio representation on the basis of a decoded audio representation is also described.

26 Claims, 14 Drawing Sheets

(51) Int. Cl.
    *G06N 3/08* (2023.01)
    *G10L 21/0316* (2013.01)

(56) References Cited

U.S. PATENT DOCUMENTS

| | | | |
|---|---|---|---|
| 9,620,132 | B2 | 4/2017 | Ramamoorthy |
| 10,332,539 | B2 | 6/2019 | Disch et al. |
| 2004/0013272 | A1* | 1/2004 | Reams ............... G10L 21/06 381/1 |
| 2008/0004869 | A1 | 1/2008 | Herre et al. |
| 2010/0169081 | A1* | 7/2010 | Yamanashi .......... G10L 19/083 704/203 |
| 2011/0046947 | A1 | 2/2011 | Vaillancourt et al. |
| 2011/0170711 | A1* | 7/2011 | Rettelbach ........... G10L 19/028 381/98 |
| 2011/0173008 | A1 | 7/2011 | Lecomte et al. |
| 2012/0215546 | A1* | 8/2012 | Biswas ................ G10H 1/40 704/500 |
| 2012/0245947 | A1 | 9/2012 | Neuendorf et al. |
| 2012/0271644 | A1 | 10/2012 | Bessette et al. |
| 2013/0073296 | A1 | 3/2013 | Bayer et al. |
| 2016/0104499 | A1* | 4/2016 | Hashimoto ......... G10L 21/0388 381/58 |
| 2016/0111107 | A1 | 4/2016 | Erdogan et al. |
| 2016/0133273 | A1 | 5/2016 | Kaniewska et al. |
| 2016/0247506 | A1* | 8/2016 | Lecomte .............. G10L 19/125 |
| 2016/0307576 | A1 | 10/2016 | Fuchs et al. |
| 2017/0133029 | A1 | 5/2017 | Markovic et al. |
| 2018/0012605 | A1 | 1/2018 | Kim et al. |
| 2020/0143819 | A1 | 5/2020 | Delcroix et al. |
| 2021/0256961 | A1* | 8/2021 | Garman ................ G06N 3/08 |

FOREIGN PATENT DOCUMENTS

| | | |
|---|---|---|
| CN | 102884572 A | 1/2013 |
| CN | 102884574 A | 1/2013 |
| CN | 105723452 A | 6/2016 |
| JP | H02160298 A | 6/1990 |
| JP | 2011514557 A | 5/2011 |
| JP | 2017520803 A | 7/2017 |
| JP | 2019035862 A | 3/2019 |
| RU | 2591661 C2 | 7/2016 |
| RU | 2607263 C2 | 1/2017 |
| TW | I466102 B | 12/2014 |
| TW | I498881 B | 9/2015 |
| WO | 2006130226 A2 | 12/2006 |
| WO | 2010009098 A1 | 1/2010 |
| WO | 2019017403 A1 | 1/2019 |
| WO | 2019083130 A1 | 5/2019 |

OTHER PUBLICATIONS

"P.862.1: Mapping Function for Transforming P.862 Raw Result Scores to MOSLQO", ITU-T, (International Telecommunication Union), Tech. Rep. P.862.1, Nov. 2003, Nov. 2003, 12 pp.
"P.862.2: Wideband Extension to Recommendation P.862 for the Assessment of Wideband Telephone Networks and Speech Codecs", ITU-T, (International Telecommunication Union), Tech. Rep. P.862.2, Nov. 2005, Nov. 2005, 12 pp.
"Perceptual objective listening quality assessment (POLQA)", ITU-T Recommendation P.863, 2011. [Online]. Available: http://www.itu.int/rec/T-REC-P.863/en, Jan. 2011, 76 pp.
"Speech codec speech processing functions; Adaptive Multi-Rate—Wideband (AMR-WB) speech codec; Transcoding functions", 3GPP, 3rd Generation Partnership Project (3GPP), TS 26.190, V9.0.9, Dec. 2009. [Online]. Available: http://www.3gpp.org/ftp/Specs/html-info/26190.htm, Dec. 2009, 51 pp.
"Super wideband stereo speech database", NTT-AT, http://www.ntt-at.com/product/widebandspeech, accessed: Sep. 9, 2014. [Online]. Available: http://www.nttat.com/product/widebandspeech, Sep. 9, 2014, 3 pp.
"TS 26.445, EVS Codec Detailed Algorithmic Description; 3GPP Technical Specification (Release 12)", 3GPP, 3rd Generation Partnership Project, Dec. 2014. [Online]. Available: http://www.3gpp.org/ftp/Specs/html-info/26445.htm, Dec. 2014, 23 pp.
Abadi, Martin, et al., "TensorFlow: Large-scale machine learning on heterogeneous systems", 2015, software available from tensorflow.org. [Online]. Available: http://tensorflow.org/, 9 pp.
Chen, Juin-Hwey, et al., "Adaptive postfiltering for quality enhancement of coded speech", IEEE Transactions on Speech and Audio Processing, vol. 3, No. 1, pp. 59-71, 1995, pp. 59-65. Uploaded in 2 parts.
Chollet, Francois, et al., "Keras", https://keras.io, 2015, 5 pp.
Das, Sneha, et al., "Postfiltering using log-magnitude spectrum for speech and audio coding", Proc. Interspeech 2018, pp. 3543-3547. [Online]. Available: http://dx.doi.org/10.21437/Interspeech.2018-1027, pp. 3543-3547.
Dietz, Martin, et al., "Overview of the EVS codec architecture", IEEE, 2015, 5 pp.
Garofolo, John S, et al., "TIMIT: acoustic-phonetic continuous speech corpus", Linguistic Data Consortium, 1993, 1993, 52 pp. Uploaded in 6 parts.
Glorot, Xavier, et al., "Deep sparse rectifier neural networks", International Conference on Artificial Intelligence and Statistics, 2011, p. 315-323., pp. 315-323.
Han, Kun, et al., "Learning spectral mapping for speech dereverberation and denoising", IEEE/ACM Transactions on Audio, Speech, and Language Processing, vol. 3, No. 6, Jun. 2015, 7 pp. Uploaded in 2 parts.
Ioffe, Sergey, et al., "Batch normalization: Accelerating deep network training by reducing internal covariate shift", International Conference on Machine Learning, vol. 37, 2015, 9 pp.
Kingma, Diederik P, et al., "Adam: A method for stochastic optimization", arXiv preprint arXiv:1412.6980, 2015, 2015, 11 pp. Uploaded in 2 parts.
Mack, Wolfgang, et al., "Single-channel dereverberation using direct MMSE optimization and bidirectional LSTM networks", Proc. Interspeech 2018, 2018, pp. 1314-1318. [Online]. Available: http://dx.doi.org/10.21437/Interspeech.2018-1296, pp. 1314-1318.
Mirsamadi, Seyedmahdad, et al., "Causal Speech Enhancement Combining Data-Driven Learning and Suppression Rule Estimation", Interspeech, Sep. 12, 2016, XP055609994, 6 pp.
Rix, Antony W, et al., "Perceptual evaluation of speech quality (PESQ)—a new method for speech quality assessment of telephone networks and codecs", 2001 IEEE International Conference on Acoustics, Speech and Signal Processing (ICASSP), 2001, 2001, 5 pp.
Srivastava, Nitish, et al., "Dropout: A simple way to prevent neural networks from overfitting", J. Mach. Learn. Res., vol. 15, No. 1, pp. 1929-1958, Jan. 2014. [Online]. Available: http://dl.acm.org/citation.cfm?id=2627435.2670313, pp. 1929-1938. Uploaded in 3 parts.
Vaillancourt, Tommy, et al., "New post-processing techniques for low bit rate celp codecs", ICASSP, 2015, 5 pp.
Wang, Yuxuan, et al., "On training targets for supervised speech separation", IEEE/ACM Transactions on Audio, Speech, and Language Processing, vol. 22, No. 12, pp. 1849-1858, 2014, XP011559445, p. 1849-1858.
Weninger, Felix, et al., "Discriminatively trained recurrent neural networks for single-channel speech separation", IEEE Global Conference on Signal and Information Processing (GlobalSIP), 2014, 5 pp.
Williamson, Donald S, et al., "Time-frequency masking in the complex domain for speech dereverberation and denoising", 2017, online: https://www.ncbi.nlm.nih.gov/pmc/articles/PMC6089240/, 2017, 20 pp.

(56) References Cited

OTHER PUBLICATIONS

Zhao, Yan, et al., "Dnn-based enhancement of noisy and reverberant speech", 2016 IEEE International Conference on Acoustics, Speech and Signal Processing (ICASSP), 2016, 5 pp.

Zhao, Ziyue, et al., "Convolutional neural networks to enhance coded speech", IEEE/ACM Transactions on Audio, Speech, and Language Processing, vol. 27, No. 4, pp. 663-678, Apr. 2019, pp. 663-667. Uploaded in 4 parts.

Zhao, Ziyue, et al., "A CNN postprocessor to enhance coded speech", 16th International Workshop on Acoustic Signal Enhancement (IWAENC), 2018, 6 pp.

Zhao, Ziyue, et al., "Enhancement of G.711-Coded Speech Providing Quality Higher Than Uncoded", Oct. 2018; online available: https://www.researchgate.net/profile/Ziyue_ (Dec. 16, 2019), XP055653139, 6 pp.

Koizumi, Yuma, et al., "Black-Box Optimization of DNN Sound Source Enhancement Function for Improving Auditory Evaluation", CD-ROM of Essays of Research Presentation in Autumn 2017 of Acoustical Society of Japan, 4 pp.

Zhao, Yan, et al., "A two-stage algorithm for noisy and reverberant speech enhancement", 2017 IEEE International Conference on Acoustics, Speech and Signal Processing (ICASSP), [Search on Dec. 26, 2022], <URL: https://www.ieeexplore.ieee.org/document/7953224>, 6 pp.

"Rectifier (Neural Networks)", Wikipedia, Entire document particularly paras. 1-4., Jul. 5, 2018, 1 pp.

Brownlee, Jason, "A Gentle Introduction to the Rectified Linear Unit (ReLU)", For Deep Learning Neural Networks. Rectified Linear Activation Function. http://web.archive.org/web/20190612135522/https://machinelearningmastery.com/rectifiedlinear-activation-function-for-deep-learning-neural-networks/, 24 pp.

Holters, Martin, et al., "Parametric Higher-Order Shelving Filters", 14th European Signal Processing Conference, Sep. 8, 2006, Entire Document Particularly Sections 2.1-2.3, 5 pp.

\* cited by examiner

| SNR (dB) | -10 | -5 | 0 | 5 | 10 |
|---|---|---|---|---|---|
| % | 97.22 | 95.74 | 93.69 | 90.91 | 87.39 |

Fig. 5c: Percentage of mask values that lie in interval (0.1) for different signal to noise ratio (SNR)

| Mask Thresholds | 6.65 kbps | 8.85 kbps | 12.65 kbps |
|---|---|---|---|
| [0; 1] | 38.94% | 41.00% | 44.09% |
| (1; 2] | 31.19% | 33.44% | 36.20% |
| (2; 5] | 21.40% | 18.69% | 14.66% |
| (5; 10] | 5.52% | 4.48% | 3.28% |
| (10; $\infty$] | 2.94% | 2.39% | 1.77% |

Fig. 5d: Percentage of mask values in different threshold regions measured at lowest 3 birates of AMR-WB average PESQ and POLQA scores evaluating the oracle experiment with different bounds of the mask at 6.65 kbps average PESQ and POLQA scores evaluating the performance of proposed methods and EVS post processor

AUDIO DECODER, APPARATUS FOR DETERMINING A SET OF VALUES DEFINING CHARACTERISTICS OF A FILTER, METHODS FOR PROVIDING A DECODED AUDIO REPRESENTATION, METHODS FOR DETERMINING A SET OF VALUES DEFINING CHARACTERISTICS OF A FILTER AND COMPUTER PROGRAM

CROSS-REFERENCE TO RELATED APPLICATIONS

This application is a continuation of copending International Application No. PCT/EP2020/060148, filed Apr. 9, 2020, which is incorporated herein by reference in its entirety, and additionally claims priority from International Application No. PCT/EP2019/059355, filed Apr. 11, 2019, which is also incorporated herein by reference in its entirety.

1. TECHNICAL FIELD

Embodiments according to the present invention are related to an audio decoder.

Further embodiments according to the present invention are related to an apparatus for determining a set of values defining characteristics of a filter.

Further embodiments according to the invention are related to a method for providing a decoded audio representation.

Further embodiments according to the invention are related to a method for determining a set of values defining characteristics of a filter.

Further embodiments according to the invention are related to respective computer programs.

Embodiments according to the invention are related to a real-valued mask based post-filter for enhancing the quality of coded speech.

Embodiments according to the present invention are generally related to a Post-filter for enhancing the decoded audio of an audio decoder, determining a set of values defining the filter characteristics based on a decoded audio representation.

2. BACKGROUND OF THE INVENTION

In the following, an introduction into some conventional solutions will be provided. In view of this situation, there is a desire for a concept which provides for an improved compromise between bitrate, audio quality and complexity when decoding an audio content.

3. SUMMARY

According to an embodiment, an audio decoder for providing a decoded audio representation on the basis of an encoded audio representation may have a filter for providing an enhanced audio representation of the decoded audio representation, wherein the filter is configured to obtain a plurality of scaling values, which are associated with different frequency bins or frequency ranges, on the basis of spectral values of the decoded audio representation which are associated with different frequency bins or frequency ranges, and wherein the filter is configured to scale spectral values of the decoded audio signal representation, or a pre-processed version thereof, using the scaling values, to obtain the enhanced audio representation.

Another embodiment may have an apparatus for determining a set of values defining characteristics of a filter for providing an enhanced audio representation on the basis of a decoded audio representation, wherein the apparatus is configured to obtain spectral values of the decoded audio representation, which are associated with different frequency bins or frequency ranges, and wherein the apparatus is configured to determine the set of values defining the characteristics of the filter, such that scaling values provided by the filter on the basis of the spectral values of the decoded audio representation, which are associated with different frequency bins or frequency ranges, approximate target scaling values, or wherein the apparatus is configured to determine the set of values defining the characteristics of the filter such that a spectrum obtained by the filter on the basis of the spectral values of the decoded audio representation, which are associated with different frequency bins or frequency ranges and using scaling values obtained on the basis of the decoded audio representation approximates a target spectrum.

According to another embodiment, a method for providing an enhanced audio representation on the basis of an encoded audio representation, may have the steps of: providing a decoded audio representation of the encoded audio representation, obtaining a plurality of scaling values, which are associated with different frequency bins or frequency ranges, on the basis of spectral values of the decoded audio representation which are associated with different frequency bins or frequency ranges, and scaling spectral values of the decoded audio signal representation, or a pre-processed version thereof, using the scaling values, to obtain the enhanced audio representation.

According to another embodiment, a method for determining a set of values defining characteristics of a filter for providing an enhanced audio representation on the basis of a decoded audio representation may have the steps of: obtaining spectral values of the decoded audio representation, which are associated with different frequency bins or frequency ranges, and determining the set of values defining the characteristics of the filter, such that scaling values provided by the filter on the basis of the spectral values of the decoded audio representation, which are associated with different frequency bins or frequency ranges, approximate target scaling values, or determining the set of values defining the characteristics of the filter such that a spectrum obtained by the filter on the basis of the spectral values of the decoded audio representation, which are associated with different frequency bins or frequency ranges and using scaling values obtained on the basis of the decoded audio representation approximates a target spectrum.

Another embodiment may have a non-transitory digital storage medium having a computer program stored thereon to perform any one of the inventive methods when said computer program is run by a computer.

According to another embodiment, an audio decoder for providing a decoded audio representation on the basis of an encoded audio representation may have a filter for providing an enhanced audio representation of the decoded audio representation, wherein the filter is configured to obtain a plurality of scaling values, which are associated with different frequency bins or frequency ranges, on the basis of spectral values of the decoded audio representation which are associated with different frequency bins or frequency ranges, and wherein the filter is configured to scale spectral values of the decoded audio signal representation, or a pre-processed version thereof, using the scaling values, to obtain the enhanced audio representation; wherein the filter includes a Neural network or a machine learning structure configured to provide the scaling values on the basis of a plurality of spectral values describing the decoded audio representation, spectral values which are associated with different frequency bins or frequency ranges; wherein the neural network or the machine learning structure is trained such that a scaling for one or more spectral values of the spectral decomposition of the decoded audio signal representation, or for one or more preprocessed spectral values which are based on the spectral values of the spectral decomposition of the decoded audio signal representation, lies within a range between 0 and a predetermined maximum value, wherein the maximum value is greater than 1.

According to another embodiment, an audio decoder for providing a decoded audio representation on the basis of an encoded audio representation may have a filter for providing an enhanced audio representation of the decoded audio representation, wherein the filter is configured to obtain a plurality of scaling values, which are associated with different frequency bins or frequency ranges, on the basis of spectral values of the decoded audio representation which are associated with different frequency bins or frequency ranges, and wherein the filter is configured to scale spectral values of the decoded audio signal representation, or a pre-processed version thereof, using the scaling values, to obtain the enhanced audio representation; wherein the filter includes a Neural network or a machine learning structure configured to provide the scaling values on the basis of a plurality of spectral values describing the decoded audio representation, spectral values which are associated with different frequency bins or frequency ranges; wherein the neural network or the machine learning structure is trained such that the scaling for one or more spectral values of the spectral decomposition of the decoded audio signal representation, or for one or more preprocessed spectral values which are based on the spectral values of the spectral decomposition of the decoded audio signal representation, is limited to 2, or is limited to 5, or is limited to 10, or is limited to a predetermined value greater than 1.

According to another embodiment, an audio decoder for providing a decoded audio representation on the basis of an encoded audio representation may have: a filter for providing an enhanced audio representation of the decoded audio representation, wherein the filter is configured to obtain a plurality of scaling values, which are associated with different frequency bins or frequency ranges, on the basis of spectral values of the decoded audio representation which are associated with different frequency bins or frequency ranges, and wherein the filter is configured to scale spectral values of the decoded audio signal representation, or a pre-processed version thereof, using the scaling values, to obtain the enhanced audio representation; wherein the filter includes a Neural network or a machine learning structure configured to provide the scaling values on the basis of a plurality of spectral values describing the decoded audio representation, spectral values which are associated with different frequency bins or frequency ranges; wherein the neural network or the machine learning structure is trained such that the scaling values are limited to 2, or are limited to 5, or are limited to 10, or are limited to a predetermined value greater than 1.

According to another embodiment, an audio decoder for providing a decoded audio representation on the basis of an encoded audio representation may have a filter for providing an enhanced audio representation of the decoded audio representation, wherein the filter is configured to obtain a plurality of scaling values, which are associated with different frequency bins or frequency ranges, on the basis of spectral values of the decoded audio representation which are associated with different frequency bins or frequency ranges, and wherein the filter is configured to scale spectral values of the decoded audio signal representation, or a pre-processed version thereof, using the scaling values, to obtain the enhanced audio representation; wherein the filter includes a Neural network or a machine learning structure configured to provide the scaling values on the basis of a plurality of spectral values describing the decoded audio representation, spectral values which are associated with different frequency bins or frequency ranges; wherein the filter is configured to normalize input features of the neural network or of the machine learning structure to a predetermined mean value and/or to a predetermined variance or standard deviation.

According to another embodiment, an audio decoder for providing a decoded audio representation on the basis of an encoded audio representation, may have a filter for providing an enhanced audio representation of the decoded audio representation, wherein the filter is configured to obtain a plurality of scaling values, which are associated with different frequency bins or frequency ranges, on the basis of spectral values of the decoded audio representation which are associated with different frequency bins or frequency ranges, and wherein the filter is configured to scale spectral values of the decoded audio signal representation, or a pre-processed version thereof, using the scaling values, to obtain the enhanced audio representation; wherein the filter includes a Neural network or a machine learning structure configured to provide the scaling values on the basis of a plurality of spectral values describing the decoded audio representation, spectral values which are associated with different frequency bins or frequency ranges; wherein input signals of the Neural network or of the machine learning structure represent logarithmic magnitudes of spectral values of the decoded audio representation, spectral values which are associated with different frequency bins or frequency ranges.

According to another embodiment, an audio decoder for providing a decoded audio representation on the basis of an encoded audio representation may have: a filter for providing an enhanced audio representation of the decoded audio representation, wherein the filter is configured to obtain a plurality of scaling values, which are associated with different frequency bins or frequency ranges, on the basis of spectral values of the decoded audio representation which are associated with different frequency bins or frequency ranges, and wherein the filter is configured to scale spectral values of the decoded audio signal representation, or a pre-processed version thereof, using the scaling values, to obtain the enhanced audio representation; wherein the filter includes a Neural network or a machine learning structure configured to provide the scaling values on the basis of a plurality of spectral values describing the decoded audio representation, spectral values which are associated with different frequency bins or frequency ranges; wherein the neural net includes an input layer, one or more hidden layers and an output layer; wherein the one or more hidden layers use rectified linear units as activation functions.

According to another embodiment, an audio decoder for providing a decoded audio representation on the basis of an encoded audio representation may have: a filter for providing an enhanced audio representation of the decoded audio representation, wherein the filter is configured to obtain a plurality of scaling values, which are associated with different frequency bins or frequency ranges, on the basis of spectral values of the decoded audio representation which are associated with different frequency bins or frequency ranges, and wherein the filter is configured to scale spectral values of the decoded audio signal representation, or a pre-processed version thereof, using the scaling values, to obtain the enhanced audio representation; wherein the filter includes a Neural network or a machine learning structure configured to provide the scaling values on the basis of a plurality of spectral values describing the decoded audio representation, spectral values which are associated with different frequency bins or frequency ranges; wherein the neural net includes an input layer, one or more hidden layers and an output layer; wherein the output layer uses rectified linear units or bounded rectified linear units or sigmoid functions as activation functions.

According to another embodiment, an audio decoder for providing a decoded audio representation on the basis of an encoded audio representation, may have: a filter for providing an enhanced audio representation of the decoded audio representation, wherein the filter is configured to obtain a plurality of scaling values, which are associated with different frequency bins or frequency ranges, on the basis of spectral values of the decoded audio representation which are associated with different frequency bins or frequency ranges, and wherein the filter is configured to scale spectral values of the decoded audio signal representation, or a pre-processed version thereof, using the scaling values, to obtain the enhanced audio representation; wherein the filter is configured to derive logarithmic magnitude values and to determine the scaling values on the basis of the logarithmic magnitude values.

Another embodiment may have an apparatus for determining a set of values defining characteristics of a filter for providing an enhanced audio representation on the basis of a decoded audio representation, wherein the filter is configured to scale spectral values of the decoded audio signal representation, or a pre-processed version thereof, using scaling values, to obtain the enhanced audio representation, wherein the apparatus is configured to obtain spectral values of the decoded audio representation, which are associated with different frequency bins or frequency ranges, and wherein the apparatus is configured to determine the set of values defining the characteristics of the filter, such that scaling values, which are associated with different frequency bins or frequency ranges and which are provided by the filter on the basis of the spectral values of the decoded audio representation, which are associated with different frequency bins or frequency ranges, approximate target scaling values, or wherein the apparatus is configured to determine the set of values defining the characteristics of the filter such that a spectrum obtained by the filter on the basis of the spectral values of the decoded audio representation, which are associated with different frequency bins or frequency ranges and using scaling values obtained on the basis of the decoded audio representation approximates a target spectrum.

According to another embodiment, an audio decoder for providing a decoded audio representation on the basis of an encoded audio representation may have: a filter for providing an enhanced audio representation of the decoded audio representation, wherein the filter is configured to obtain a plurality of scaling values, which are associated with different frequency bins or frequency ranges, on the basis of spectral values of the decoded audio representation which are associated with different frequency bins or frequency ranges, and wherein the filter is configured to scale spectral values of the decoded audio signal representation, or a pre-processed version thereof, using the scaling values, to obtain the enhanced audio representation; wherein the filter is configured to obtain the scaling values such that the scaling values cause an amplification for one or more spectral values of the decoded audio signal representation, or for one or more preprocessed spectral values which are based on the spectral values of decoded audio signal representation.

According to another embodiment, an audio decoder for providing a decoded audio representation on the basis of an encoded audio representation may have: a filter for providing an enhanced audio representation of the decoded audio representation, wherein the filter is configured to obtain a plurality of scaling values, which are associated with different frequency bins or frequency ranges, on the basis of spectral values of the decoded audio representation which are associated with different frequency bins or frequency ranges, and wherein the filter is configured to scale spectral values of the decoded audio signal representation, or a pre-processed version thereof, using the scaling values, to obtain the enhanced audio representation; wherein the filter is configured to obtain the scaling values such that the scaling values allow both amplification and attenuation by the scaling.

An embodiment according to the present invention creates an audio decoder (e.g. a speech decoder or a general audio decoder or an audio decoder switching between a speech decoding mode, e.g. a linear-prediction-based decoding mode, and a general audio decoding mode, e.g. a spectral-domain-representation based coding mode using scaling factors for scaling decoded spectral values) for providing a decoded audio representation on the basis of an encoded audio representation.

The audio decoder comprises a filter (or 'post-filter') for providing an enhanced audio representation (e.g. $\hat{X}(k,n)$) of the decoded audio representation (e.g. $\tilde{X}(k,n)$),wherein the input audio representation which is used by the filter may, for example, be provided by a decoder core of the audio decoder.

The filter (or post-filter) is configured to obtain a plurality of scaling values (e.g. mask values, e.g. $M(k,n)$), which may, for example, be real valued, and which may, for example, be non-negative, and which may, for example, be limited to a predetermined range, and which are associated with different frequency bins or frequency ranges (e.g. having frequency bin index or frequency range index k), on the basis of spectral values of the decoded audio representation which are associated with different frequency bins or frequency ranges (e.g. having frequency bin index or frequency range index k).

The filter (or post-filter) is configured to scale spectral values of the decoded audio signal representation (e.g. $\tilde{X}(k,n)$), or a pre-processed version thereof, using the scaling values (e.g. $M(k,n)$), to obtain the enhanced audio representation (e.g. $\hat{X}(k,n)$).

This embodiment is based on the idea that an audio quality can be efficiently improved using a scaling of spectral values of a decoded audio signal representation, wherein scaling values are derived on the basis of the spectral values of the decoded audio representation. It has been found that a filtering, which is effected by the scaling of the spectral values, can be efficiently adapted to the signal characteristics on the basis of the spectral values of the decoded audio representation, and can enhance the quality of the decoded audio representation. For example, on the basis of the spectral values of the decoded audio representation, a filter setting (which may be defined by the scaling values) can be adjusted in a manner to reduce an impact of a quantization noise. For example, the adjustment of the scaling values on the basis of the spectral values of the decoded audio representation may use a machine-learning structure or a neural network, which can provide the scaling values in a computationally efficient manner.

In particular, it has been found that the derivation of the scaling values from the spectral values of the decoded audio representation is still advantageous and possible with good results even if the quantization noise is generally correlated with the signal. Accordingly, the concept can be applied with particularly good results in this situation.

To conclude, the above-described audio encoder allows for an enhancement of an achievable audio quality using a filter, a characteristic of which is adjusted on the basis of the spectral values of the decoded audio representation, wherein the filtering operation may, for example, be performed in an efficient manner by scaling spectral values using the scaling values. Thus, a hearing impression can be improved, wherein it is not needed to rely on any additional side information to control the adjustment of the filter. Rather, the adjustment of the filter may be solely based on the decoded spectral values of a currently processed frame regardless of the coding scheme used for generating the encoded and the decoded representations of the audio signal, and possibly decoded spectral values of one or more previously decoded frames and/or one or more subsequently decoded frames.

In an embodiment of the audio decoder, the filter is adapted to use a configurable processing structure (e.g. a "machine learning" structure, like a neural net), a configuration of which is based on a machine learning algorithm, in order to provide the scaling values.

By using a configurable processing structure, like a machine-learning structure or a neural network, the characteristics of the filter can easily be adjusted on the basis of coefficients defining the functionality of the configurable processing structure. Accordingly, it is typically possible to adjust the characteristics of the filter over a wide range in dependence on the spectral values of the decoded audio representation. Consequently, it is possible to obtain an improved audio quality under many different circumstances.

In an embodiment of the audio decoder, the filter is configured to determine the scaling values solely on the basis of the spectral values of the decoded audio representation in a plurality of frequency bins or frequency ranges (e.g. without using any additional signaling information when deriving the scaling values from the spectral values).

Using such a concept, it is possible to improve an audio quality independently from the presence of a side information.

The computational and structural complexity can be kept reasonably low, as a coherent and universal representation of the decoded audio signal (the spectral values of the decoded audio representation) is used, which is agnostic to the coding techniques used to obtain the encoded and decoded representation. In this case, complex and specific operations on specific side-information values are avoided. In addition, it is generally possible to derive scaling values based on the spectral values of the decoded audio representation using a universal processing structure (such as a neural network), which uses a limited number of different computation functionalities (such as scaled summations and evaluation of activation functions).

In an embodiment of the audio decoder, the filter is configured to obtain magnitude values $|\hat{X}(k,n)|$ (which may, for example, describe an absolute value or an amplitude or a norm) of the enhanced audio representation according to $$|\hat{X}(k,n)| = M(k,n) * |\tilde{X}(k,n)|,$$

wherein $M(k,n)$ is a scaling value, wherein k is a frequency index (e.g. designating different frequency bins or frequency ranges), wherein n is a time index (e.g. designating different overlapping or non-overlapping frames), and wherein $|\tilde{X}(k,n)|$ is a magnitude value of a spectral value of decoded audio representation. The magnitude value $|\tilde{X}(k,n)|$ can be a magnitude, an absolute value, or any norm of a spectral value obtained by applying a time-frequency transform like SIFT (Short-term Fourier transform), FFT or MDCT, to the decoded audio signal.

Alternatively, the filter may be configured to obtain values $\hat{X}(k,n)$ of the enhanced audio representation according to $$\hat{X}(k,n) = M(k,n) * \tilde{X}(k,n),$$

wherein $M(k,n)$ is a scaling value, wherein k is a frequency index (e.g. designating different frequency bins or frequency ranges), wherein n is a time index (e.g. designating different overlapping or non-overlapping frames), and wherein $\tilde{X}(k,n)$ is a spectral value of the decoded audio representation.

It has been found that such a simple derivation of the magnitude value of the enhanced audio representation, or of (typically complex-valued) values of the enhanced audio representation can be performed with good efficiency and still results in a remarkable improvement of audio quality.

In an embodiment of the audio decoder, the filter is configured to obtain the scaling values such that the scaling values cause a scaling (or, in some cases, an amplification) for one or more spectral values of the decoded audio signal representation, or for one or more preprocessed spectral values which are based on the spectral values of decoded audio signal representation.

By performing such a scaling, which may advantageously, but not necessarily, cause an amplification or an attenuation for at least one spectral value (and which may typically also result in an attenuation of at least one spectral value), a spectrum of the decoded audio representation can be shaped in an efficient manner. For example, by allowing both amplification and attenuation by the scaling, artifacts, which could be caused by a limited precision of a number representation can also be reduced in some cases. Furthermore, the adjustment of the scaling values optionally comprises an additional degree of freedom by avoiding the restriction of scaling values to values smaller than one. Accordingly, a good enhancement of an audio quality can be achieved.

In an embodiment of the audio decoder, the filter comprises a Neural network or a machine learning structure configured to provide the scaling values on the basis of a plurality of spectral values describing the decoded audio representation (e.g. describing magnitudes of a transformed representation of the decoded audio representation), wherein the spectral values are associated with different frequency bins or frequency ranges.

It has been found that using a neural network or a machine-learning structure in such a filter brings along a comparatively high efficiency. It has also been found that a neural network or a machine-learning structure can easily handle the spectral values of the decoded audio representation of the input quantity, in cases in which the number of spectral values input into the neural network or the machine-learning structure is comparatively high. It has been found that neural networks or machine-learning structures can well handle such a high number of input signals or input quantities, and it can also provide a large number of different scaling values as output quantities. In other words, it has been found that neural networks or machine-learning structures are well-suited to derive a comparatively large number of scaling values on the basis of a comparatively large number of spectral values without involving excessive computational resources. Thus, the scaling values can be adjusted to the spectral values of the decoded audio representation in a very precise manner without undue computational load, wherein details of the spectrum of the decoded audio representation can be considered when adjusting the filtering characteristic. Also, it has been found that the coefficients of a neural network or of a machine-learning structure providing the scaling values can be determined with reasonable effort, and that a neural network or a machine-learning structure provides sufficient degrees of freedom to achieve a precise determination of scaling values.

In an embodiment of the audio decoder, input signals of the Neural network or of the machine learning structure represent the logarithmic magnitudes, amplitude or norm of spectral values of the decoded audio representation, wherein the spectral values are associated with different frequency bins or frequency ranges.

It has been found that it is advantageous to provide logarithmic magnitudes of spectral values, amplitudes of spectral values or norms of spectral values as input signals of the neural network or of the machine-learning structure. It has been found that the sign or the phase of the spectral values is of subordinate importance for the adjustment of the filter, i.e. for the determination of the scaling values. In particular, it has been found that logarithmizing magnitudes of the spectral values of the decoded audio representation is particularly advantageous, since a dynamic range can be reduced. It has been found that a neural network or a machine-learning structure can typically better handle logarithmized magnitudes of the spectral values when compared to the spectral values themselves, since the spectral values typically have a high dynamic range. By using logarithmized values, it is also possible to use a simplified number representation in the (artificial) neural network or in the machine-learning structure, since it is often not needed to use a floating point number of representation. Rather, it is possible to design the neural network or the machine-learning structure using a fixed point number representation, which significantly reduces an implementation effort.

In an embodiment of the audio decoder, output signals of the Neural network or of the machine learning structure represent the scaling values (e.g. mask values).

By providing the scaling values as output signals (or output quantities) of the neural network or of the machine-learning structure, an implementation effort can be held reasonably low. For example, a neural network or a machine-learning structure providing a comparatively large number of scaling values is easy to implement. For example, a homogenous structure can be used, which reduces the implementation effort.

In an embodiment of the audio decoder, the neural network or the machine learning structure is trained to limit, to reduce or to minimize a deviation (e.g. a mean square error; e.g. $MSE_{MA}$) between a plurality of target scaling values (e.g. IRM(k,n)) and a plurality of scaling values (e.g. M(k, n)) obtained using the neural network or using the machine learning structure.

By training the neural network or the machine-learning structure in this manner, it can be achieved that the enhanced audio representation, which is obtained by scaling the spectral values of the decoded audio signal representation (or a preprocessed version thereof) using the scaling values, provides a good hearing impression. For example, the target scaling values can easily be determined, for example, on the basis of a knowledge of an encoder-sided lossy processing. Thus, it can be determined with little effort which scaling values best approximate the spectral values of the decoded audio representation to an ideal enhanced audio representation (which may, for example, be equal to an input audio representation of an audio encoder). In other words, by training the neural network or the machine-learning structure to limit, to reduce or to minimize a deviation between a plurality of target scaling values and the plurality of scaling values obtained using the neural network or using the machine-learning structure, for example, for a plurality of different audio contents or types of audio contents, it can be achieved that the neural network or the machine-learning structure provides appropriate scaling values even for different audio contents or different types of audio contents. Furthermore, by using the derivation between the target scaling values and the scaling values obtained using the neural network or using the machine-learning structure as an optimization quantity, a complexity of the training process can be kept small and numeric problems can be avoided.

In an embodiment of the audio decoder, the neural network or the machine learning structure is trained to limit, to reduce or to minimize a deviation (e.g. $MSE_{SA}$) between a target magnitude spectrum, a target amplitude spectrum, a target absolute spectrum or a target norm spectrum (e.g. |X(k,n)|, e.g. an original spectrum of a training audio signal) and a (enhanced) magnitude spectrum, a amplitude spectrum, an absolute spectrum or a norm spectrum obtained using a scaling (e.g. a frequency-dependent scaling) of a processed (e.g. decoded, e.g. quantized, encoded and decoded) spectrum (which is, for example, based on the target magnitude spectrum and/or on the training audio signal) which uses scaling values that are provided by the neural net or by the machine learning structure (wherein input signals of the neural net are, for example, based on the decoded spectrum).

By using such a training approach, a good quality of the enhanced audio representation can typically be ensured. In particular, it has been found that neural networks or machine-learning structures also provide appropriate scaling coefficients if the decoded audio representation represents a different audio content when compared to an audio content used for the training. Furthermore, it has been found that the enhanced audio representation is perceived as being of good quality if the magnitude spectrum or the amplitude spectrum or the absolute spectrum or the norm spectrum is in a sufficiently good agreement with a desired (target) magnitude spectrum or (target) amplitude spectrum or (target) absolute spectrum or (target) norm spectrum.

In an embodiment of the audio, the neural network or the machine learning structure is trained such that a scaling for one or more spectral values of the spectral decomposition of the decoded audio signal representation, or for one or more preprocessed spectral values which are based on the spectral values of the spectral decomposition of the decoded audio signal representation, lies within a range between 0 and a predetermined maximum value.

It has been found that a limitation of the scaling (or of the scaling values) is helpful to avoid an excessive amplification of spectral values. It has been found that a very high amplification (or scaling) of one or more spectral values could result in audible artifacts. Also, it has been found that excessively large scaling values could arrive during a training, for example, if the spectral values of the decoded audio representation are very small or even equal to zero. Thus, the quality of the enhanced audio representation can be improved by using such a limitation approach.

In an embodiment of the audio decoder, the maximum value is greater than 1 (and can for example be 2, 5 or 10).

It has been found that such limitation for the scaling (or for the scaling values) brings along particularly good results. For example, by allowing an amplification (e.g., by allowing a scaling or a scaling value larger than one) artifacts which would be caused by "spectral holes" can also be partly compensated. At the same time, excessive noise can be limited by an attenuation (for example, using a scaling or scaling values smaller than one). Consequently, a very flexible signal improvement can be obtained by the scaling.

In an embodiment of the audio decoder, the neural network or the machine learning structure is trained such that the scaling (or the scaling values) for one or more spectral values of the spectral decomposition of the decoded audio signal representation, or for one or more preprocessed spectral values which are based on the spectral values of the spectral decomposition of the decoded audio signal representation, is (or are) limited to 2, or is (or are) limited to 5, or is (or are) limited to 10, or is (or are) limited to a predetermined value greater than 1.

By using such an approach, artifacts can be kept reasonably small, while amplification is allowed (which may, for example, help to avoid "spectral holes"). Thus, a good hearing impression can be obtained.

In an embodiment of the audio decoder, the neural network or the machine learning structure is trained such that the scaling values are limited to 2, or are limited to 5, or are limited to 10, or are limited to a predetermined value greater than 1.

By limiting the scaling values to such a range, particularly good quality of the enhanced audio representation can be achieved.

In an embodiment of the audio decoder, a number of input features of the neural network or of the machine learning structure (e.g. 516 or 903) is larger, at least by a factor of 2, than a number of output values (e.g. 129) of the neural network or of the machine learning structure.

It has been found that usage of a comparatively large number of input features for the neural network or the machine-learning structure, which is larger than the number of output values (or output signals) of the neural network or of the machine-learning structure results in particular reliable scaling values. In particular, by choosing a comparatively high number of input features of the neural network, it is possible to consider information from previous frames and/or from the following frames, wherein it has been found that the consideration of such additional input features typically improves the quality of the scaling values and therefore the quality of the enhanced audio representation.

In an embodiment of the audio decoder, the filter is configured to normalize input features (e.g. represented by input signals) of the neural network or of the machine learning structure (e.g. magnitudes of spectral values obtained using a short term Fourier transform) to a predetermined mean value (e.g. to a mean value of zero) and/or to a predetermined variance (e.g. to a unit variance) or standard deviation.

It has been found that a normalization of input features of the neural network or of the machine-learning structure makes the provision of the scaling values independent from a volume or loudness or intensity of the decoded audio representation. Accordingly, the neural network or the machine-learning structure can "focus" on the structural characteristics of the spectrum of the decoded audio representation and is not affected (or not affected significantly) by volume changes. Furthermore, by performing such a normalization, it can be avoided that nodes of a neural network are excessively saturated. Furthermore, the dynamic range is reduced, which is helpful to keep a number representation used within the neural network or within the machine-learning structure efficient.

In an embodiment of the audio decoder, the neural net comprises an input layer, one or more hidden layers and an output layer.

Such a structure of the neural network has proven to be advantageous for the present application.

In an embodiment of the audio decoder, the one or more hidden layers use rectified linear units as activation functions.

It has been found that using rectified linear units as activation functions allows for the provision of scaling vectors on the basis of spectral values of the decoded audio representation with good reliability.

In an embodiment of the audio decoder, the output layer uses (unbounded) rectified linear units or bounded rectified linear units or sigmoid functions (e.g. scaled sigmoid functions) as activation functions.

By using rectified linear units or bounded rectified linear units or sigmoid functions as activation functions in the output layer, the scaling values can be obtained in a reliable manner. In particular, usage of bounded rectified linear units or of sigmoid functions allows for a limitation of the scaling values to a desired range, as discussed above. Thus, the scaling values can be obtained in an efficient and reliable manner.

In an embodiment of the audio decoder, the filter is configured to obtain short term Fourier transform coefficients (e.g. $\tilde{X}(k,n)$) which represent the spectral values of the decoded audio representation, which are associated with different frequency bins or frequency ranges.

It has been found that short-term Fourier transform coefficients constitute a particularly meaningful representation of the decoded audio representation. For example, it has been recognized that short-term Fourier transform coefficients are better usable by a neural network or by machine-learning structure than MDCT coefficients in some cases (even though MDCT coefficients may be used by the audio decoder for the reconstruction of the decoded spectral representation).

In an embodiment of the audio decoder, the filter is configured to derive logarithmic magnitude, amplitude, absolute or norm values (e.g. on the basis of the short term Fourier transform coefficients) and to determine the scaling values on the basis of the logarithmic magnitude, amplitude, absolute or norm values.

It has been found that the derivation of the scaling values on the basis of non-negative values, like logarithmic magnitude values, amplitude values, absolute values or norm values, is efficient, since a consideration of the phase would significantly increase the computational demand without bringing any substantial improvement of the scaling values. Thus, the removal of the sign and typically also of the phase of the spectral values (for example, obtained by the short-term Fourier transform) brings along a good tradeoff between complexity and audio quality.

In an embodiment of the audio decoder, the filter is configured to determine a plurality of scaling values associated with a current frame (e.g. a current frame of the decoded audio representation, or a current frame of the short term Fourier transform) on the basis of spectral values of the decoded audio representation, which are associated with different frequency bins or frequency ranges, of the current frame, and on the basis of spectral values of the decoded audio representation, which are associated with different frequency bins or frequency ranges, of one or more frames preceding the current frame (e.g. past context frames).

However, it has been found that the consideration of spectral values of one or more frames preceding the current frame helps to improve the scaling vectors. This is due to the fact that many types of audio content comprise temporal correlation between subsequent frames. Thus, the neural network or a machine-learning structure may, for example, consider a temporal evolution of spectral values when determining the scaling values. For example, the neural network or the machine-learning structure may adjust the scaling values to avoid (or counteract) excessive changes of scaled spectral values (for example, in the enhanced audio representation) over time.

In an embodiment of the audio decoder, the filter is configured to determine a plurality of scaling values associated with a current frame (e.g. a current frame of the decoded audio representation, or a current frame of the short term Fourier transform) on the basis of spectral values of the decoded audio representation, which are associated with different frequency bins or frequency ranges, of one or more frames following the current frame (e.g. future context frames).

By considering spectral values of the decoded audio representation of one or more frames following the current frames, correlations between the subsequent frames can also be exploited, and the quality of the scaling values can typically be improved.

An embodiment according to the present invention creates an apparatus for determining a set of values (e.g. coefficients or a neural network, or coefficients of another machine-learning structure) defining characteristics of a filter (e.g. a neural net based filter, or a filter based on another machine learning structure) for providing an enhanced audio representation (e.g. $\hat{X}(k,n)$) on the basis of a decoded audio representation (which may, for example, be provided by an audio decoding).

The apparatus is configured to obtain spectral values (e.g. magnitudes or phases or MDCT coefficients, e.g. represented by magnitude values, e.g. $|\tilde{X}(k,n)|$) of the decoded audio representation, which are associated with different frequency bins or frequency ranges.

The apparatus is configured to determine the set of values defining the characteristics of the filter, such that scaling values provided by the filter on the basis of the spectral values of the decoded audio representation, which are associated with different frequency bins or frequency ranges, approximate target scaling values (which may be computed on the basis of a comparison of a desired enhanced audio representation and the decoded audio representation).

Alternatively, the apparatus is configured to determine the set of values defining the characteristics of the filter such that a spectrum obtained by the filter on the basis of the spectral values of the decoded audio representation, which are associated with different frequency bins or frequency ranges and using scaling values obtained on the basis of the decoded audio representation approximates a target spectrum (which may correspond to a desired enhanced audio representation, and which may be equal to an input signal of an audio encoder in a processing chain comprising the audio encoder and an audio decoder including the filter).

Using such an apparatus, a set of values defining characteristics of the filter, which is used in the above-mentioned audio decoder, can be obtained with moderate effort. In particular, the set of values, which can be coefficients of a neural network, or coefficients of another machine-learning structure, defining characteristics of the filter can be determined such that the filter uses scaling values which result in a good audio quality and lead to an improvement of the enhanced audio representation over the decoded audio representation. For example, the determination of the set of values defining characteristics of the filter can be performed on the basis of a plurality of training audio contents or reference audio contents, wherein the target scaling values or the target spectrum can be derived from the reference audio contents. However, it has been found that the set of values defining the characteristics of a filter is typically also well-suited for audio contents which differ from the reference audio contents, provided that the reference audio contents are at least to some degree representative of the audio contents which are to be decoded by the audio decoder mentioned above. Moreover, it has been found that using the scaling values provided by the filter or using the spectrum obtained by the filter as an optimization quantity results in a reliable set of values defining characteristics of the filter.

In an embodiment of the apparatus, the apparatus is configured to train a machine learning structure (e.g. a neural net), which is a part of the filter and which provides scaling values for scaling magnitude values of the decoded audio signal or spectral values of the decoded audio signal, to reduce or minimize a deviation (e.g. a mean square error; e.g. $MSE_{MA}$) between a plurality of target scaling values (e.g. $IRM(k,n)$) and a plurality of scaling values (e.g. $M(k,n)$) obtained using the neural network on the basis of spectral values of a decoded audio representation, which are associated with different frequency bins or frequency ranges.

By training the machine-learning structure using target scaling values, which may, for example, be derived on the basis of an original audio content which is encoded and decoded in a processing chain comprising the audio decoder (which derives the decoded audio representation), the machine-learning structure can be designed (or configured) to at least partially compensate for signal degradations in the processing chain. For example, the target scaling values can be determined such that the target scaling values scale the decoded audio representation in such a manner that the decoded audio representation approximates an (original) audio representation input into the processing chain (e.g., input into an audio encoder). Thus, the scaling values provided by the machine-learning structure can have a high degree of reliability and can be adapted to improve a reconstruction of an audio content, which undergoes the processing chain.

In an embodiment, the apparatus is configured to train a machine learning structure (e.g. a neural net) to reduce or minimize a deviation (e.g. $MSE_{SA}$) between a target (magnitude) spectrum (e.g. $|X(k,n)|$, e.g. an original spectrum of a training audio signal) and a (enhanced) spectrum (or magnitude spectrum) obtained using a scaling (e.g. a frequency-dependent scaling) of a processed (e.g. decoded, e.g. quantized, encoded and decoded) spectrum (which is, for example, based on the target magnitude spectrum and/or on the training audio signal) which uses scaling values that are provided by the machine learning structure (e.g. neural net). For example, input signals of the machine learning structure or of the neural net are based on the decoded spectrum.

It has been found that such a training of the machine-learning structure also results in scaling values which allow for a compensation of signal degradations in a signal processing chain (which may comprise an audio encoding and an audio decoding). For example, the target spectrum may be a spectrum of a reference audio content or training audio content which is input in a processing chain comprising a (lossy) audio encoder and the audio decoder providing the decoded audio representation. Thus, the machine-learning structure may be trained such that the scaling values scale the decoded audio representation to approximate the reference audio content input into an audio encoder. Consequently, the machine-learning structure can be trained to provide scaling values which help to overcome a degradation within the (lossy) processing chain.

In an embodiment, the apparatus is configured to train the machine learning structure (e.g. neural network) such that a scaling (or a scaling value) for spectral values of the decoded audio signal representation, or for one or more preprocessed spectral values which are based on the spectral values of decoded audio signal representation, lies within a range between 0 and 2 or lies within a range between 0 and 5 or lies within a range between 0 and 10, or lies within a range between 0 and a maximum value (which may, for example, be larger than 1).

By limiting the scaling to a predetermined range (for example, between zero and a predetermined value, which may typically be larger than one), it is possible to avoid artifacts which could be caused, for example, by excessively large scaling values. Also, it should be noted that the limitation of the scaling values (which may be provided as output signals of a neural network or of a machine-learning structure) allows for a comparatively simple implementation of the output stages (e.g. output nodes) of the neural network or of the machine-learning structure.

In an embodiment of the apparatus, the apparatus is configured to train the machine learning structure (e.g. neural network) such that the magnitude scaling (or the scaling values) for spectral values of the decoded audio signal representation, or for one or more preprocessed spectral values which are based on the spectral values of decoded audio signal representation, is (are) limited to lie within a range between 0 and a predetermined maximum value.

By limiting the magnitude scaling (or the scaling values) to lie within a range between zero and a predetermined maximum, degradation switch would be caused by an excessively strong magnitude scaling are avoided.

In an embodiment of the audio decoder, the maximum value is greater than 1 (and can for example be 2, 5 or 10).

By allowing that the maximum value of the magnitude scaling is larger than one, both attenuation and amplification can be achieved by the scaling using the scaling values. It has been shown that such a concept is particularly flexible and brings along a particularly good hearing impression.

An embodiment of the invention creates a method for providing a decoded audio representation on the basis of an encoded audio representation.

The method comprises providing an enhanced audio representation (e.g. $\hat{X}(k,n)$) of the decoded audio representation (e.g. $\tilde{X}(k,n)$), wherein the input audio representation which is used by a filter providing the enhanced audio representation may, for example, be provided by a decoder core of the audio decoder.

The method comprises obtaining a plurality of scaling values (e.g. mask values, e.g. $M(k,n)$), which may, for example, be real valued and which may, for example, be non-negative, and which may, for example, be limited to a predetermined range, and which are associated with different frequency bins or frequency ranges (e.g. having frequency bin index or frequency range index k), on the basis of spectral values of the decoded audio representation which are associated with different frequency bins or frequency ranges (e.g. having frequency bin index or frequency range index k).

The method comprises scaling spectral values of the decoded audio signal representation (e.g. $\tilde{X}(k,n)$), or a pre-processed version thereof, using the scaling values (e.g. $M(k,n)$), to obtain the enhanced audio representation (e.g. $\hat{X}(k,n)$).

This method is based on the same considerations as the above-described apparatus. Also, it should be noted that the method can be supplemented by any of the features, functionalities and details described herein, also with respect to the apparatuses. Moreover, it should be noted that the method can be supplemented by any of these features, functionalities and details both individually and taken in combination.

An embodiment creates a method for determining a set of values (e.g. coefficients or a neural network, or coefficients of another machine-learning structure) defining characteristics of a filter (e.g. neural net based filter, or a filter based on another machine learning structure) for providing an enhanced audio representation (e.g. $\hat{X}(k,n)$) on the basis of a decoded audio representation (which may, for example, be provided by an audio decoding).

The method comprises obtaining spectral values (e.g. magnitudes or phases or MDCT coefficients, represented by magnitude values, e.g. $|\tilde{X}(k,n)|$) of the decoded audio representation, which are associated with different frequency bins or frequency ranges.

The method comprises determining the set of values defining the characteristics of the filter, such that scaling values provided by the filter on the basis of the spectral values of the decoded audio representation, which are associated with different frequency bins or frequency ranges, approximate target scaling values (which may be computed on the basis of a comparison of a desired enhanced audio representation and the decoded audio representation).

Alternatively, the method comprises determining the set of values defining the characteristics of the filter such that a spectrum obtained by the filter on the basis of the spectral values of the decoded audio representation, which are associated with different frequency bins or frequency ranges and using scaling values obtained on the basis of the decoded audio representation approximates a target spectrum (which may correspond to a desired enhanced audio representation, and which may be equal to an input signal of an audio encoder in a processing chain comprising the audio encoder and an audio decoder including the filter).

This method is based on the same considerations as the above-described apparatus. However, it should be noted that the method can be supplemented by any of the features, functionalities and details described herein, also with respect to the apparatus. Moreover, the method can be supplemented by the features, functionalities and details both individually and taken in combination.

An embodiment according to the invention creates a computer program for performing the method described herein, when the computer program runs on a computer.

4. BRIEF DESCRIPTION OF THE DRAWINGS

Embodiments of the present invention will be detailed subsequently referring to the appended drawings, in which.

Figure 6:
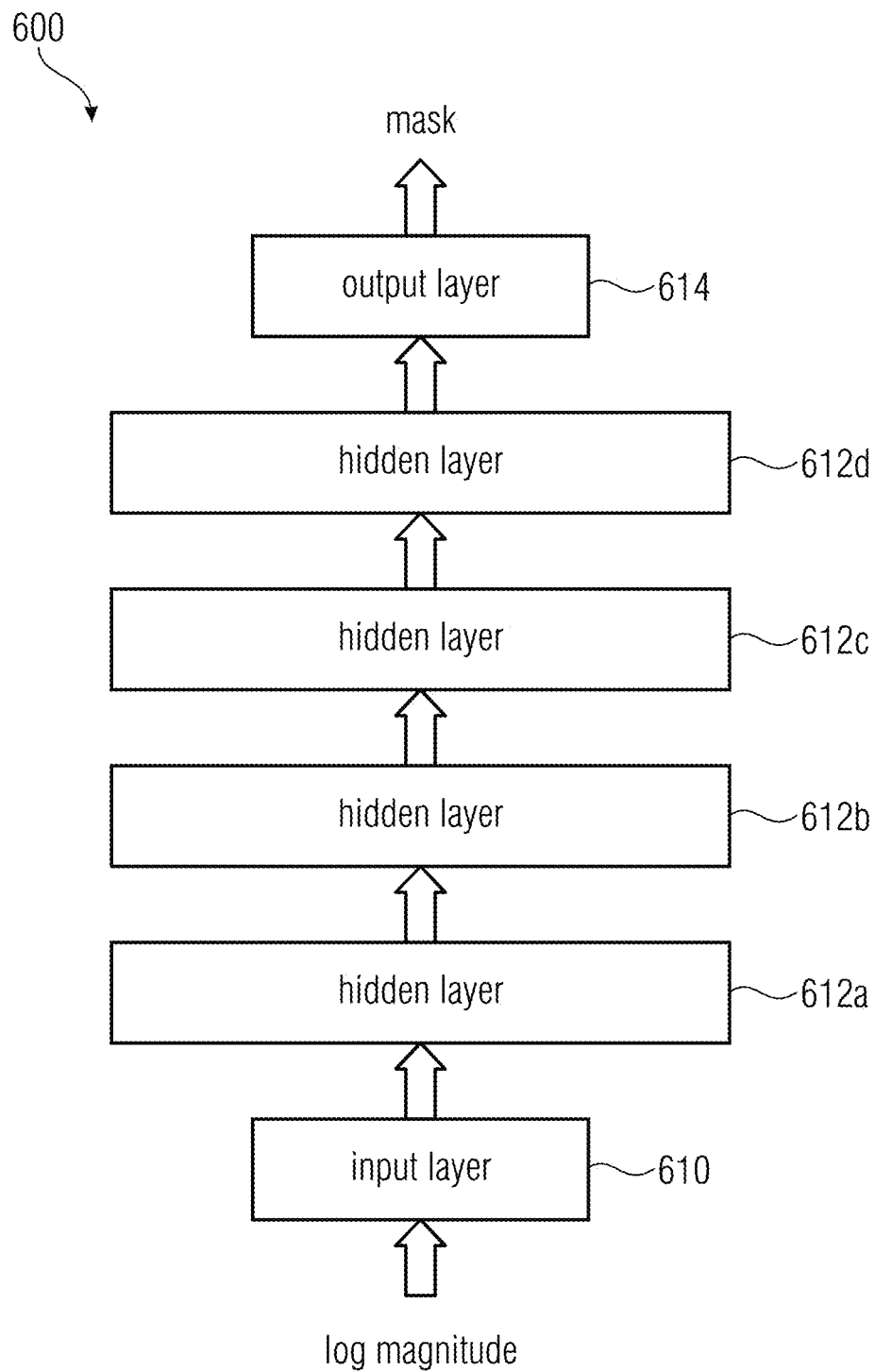
Figure 7:
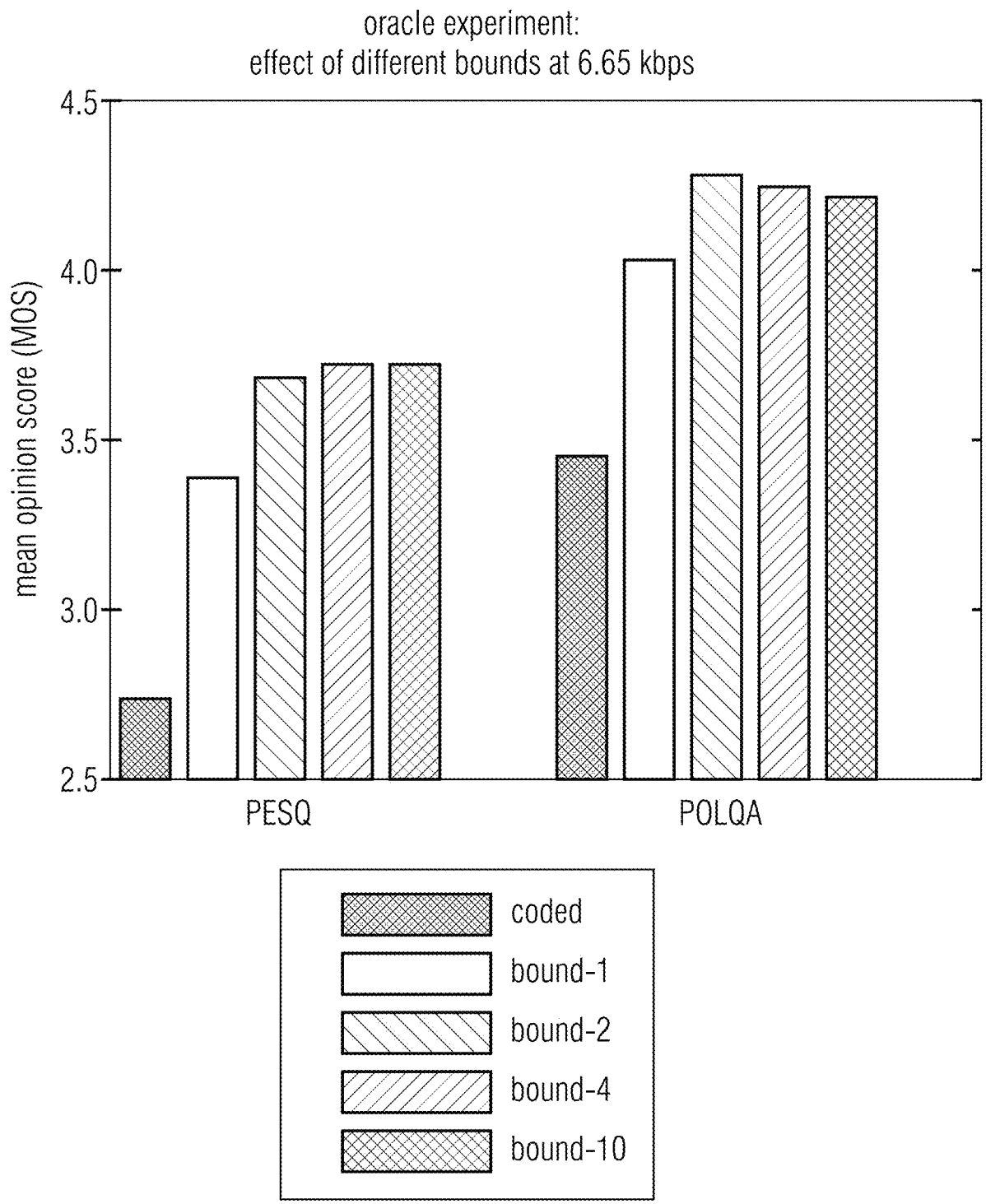
Figure 8:
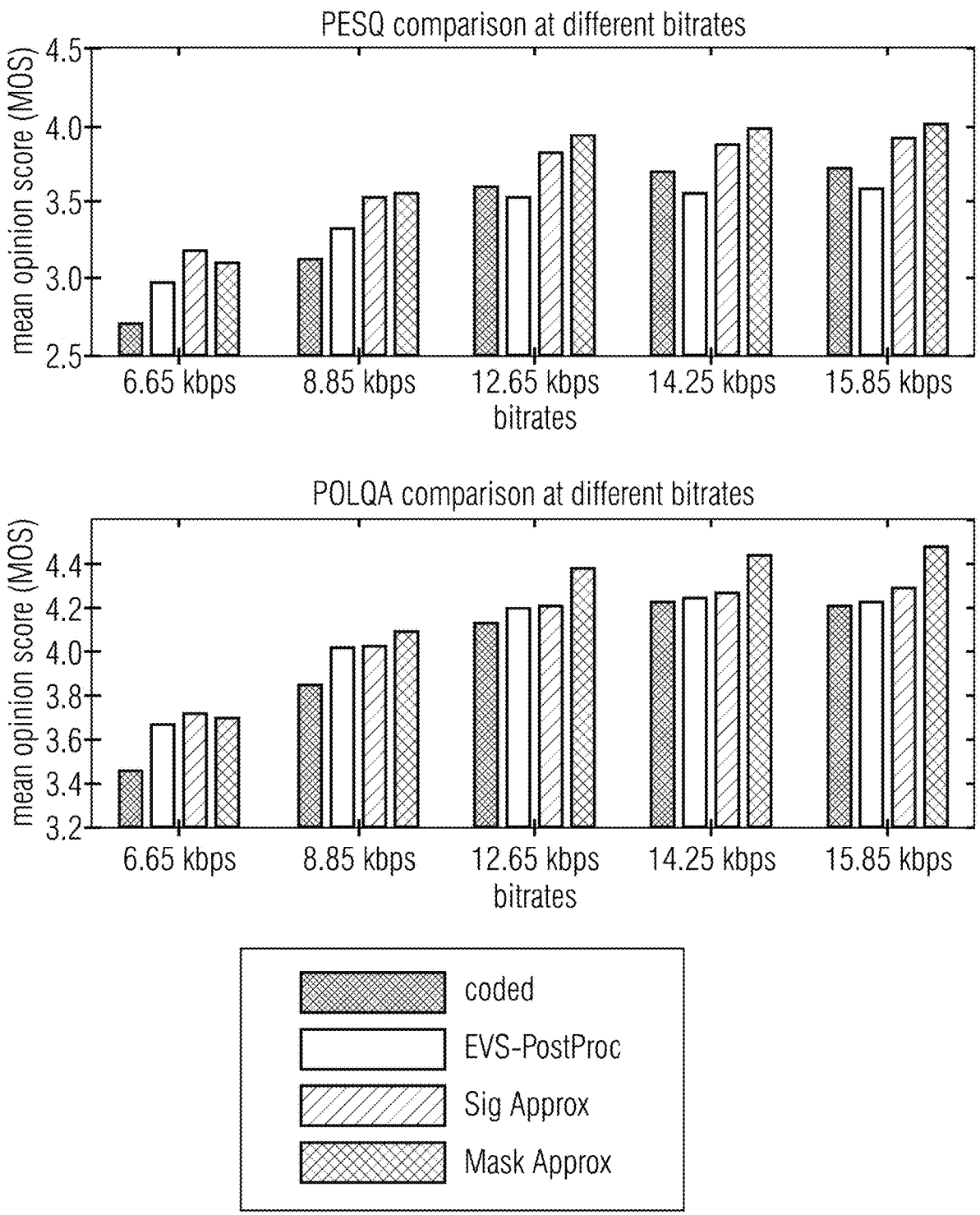
Figure 9:
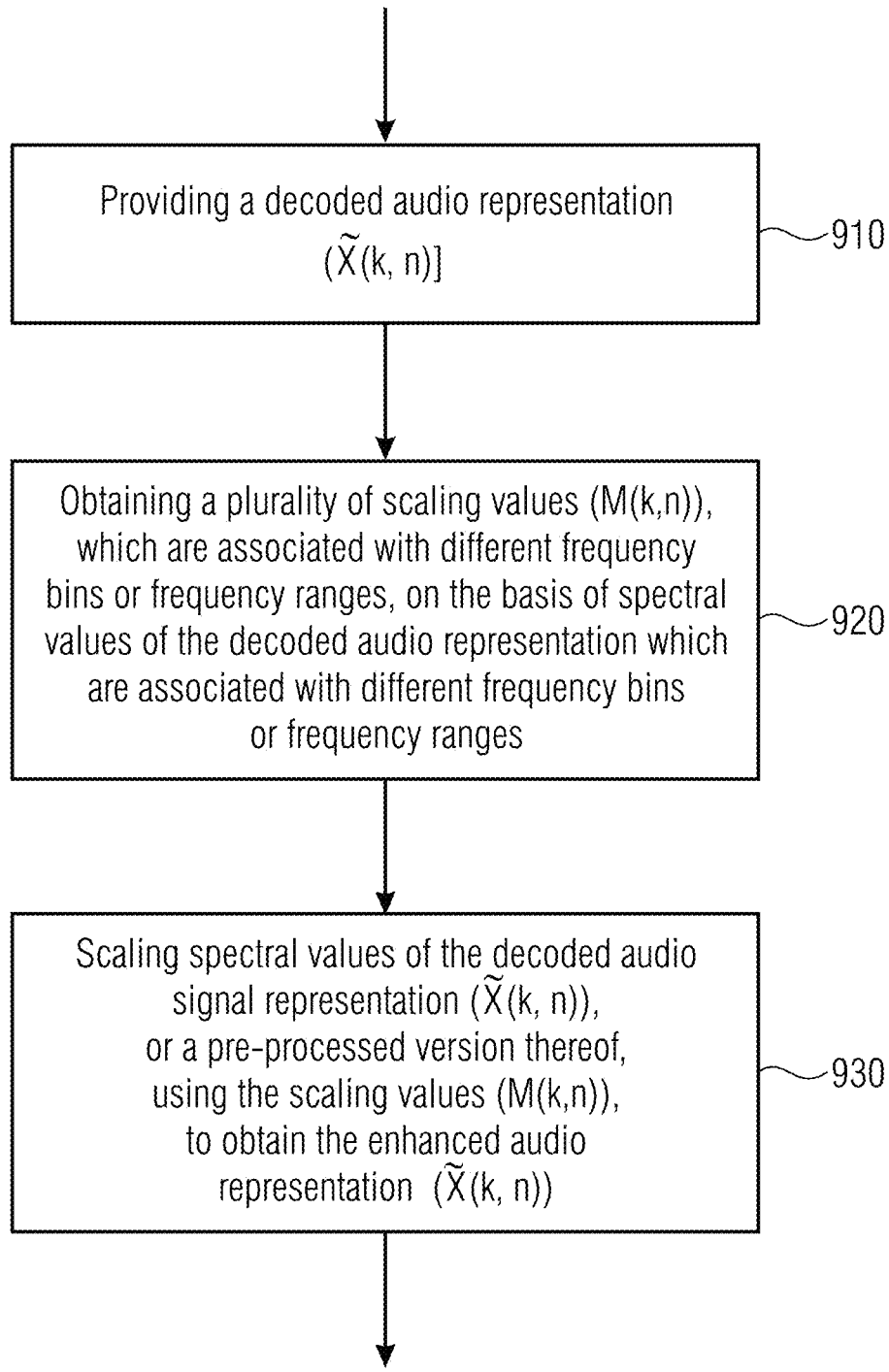
Figure 10:
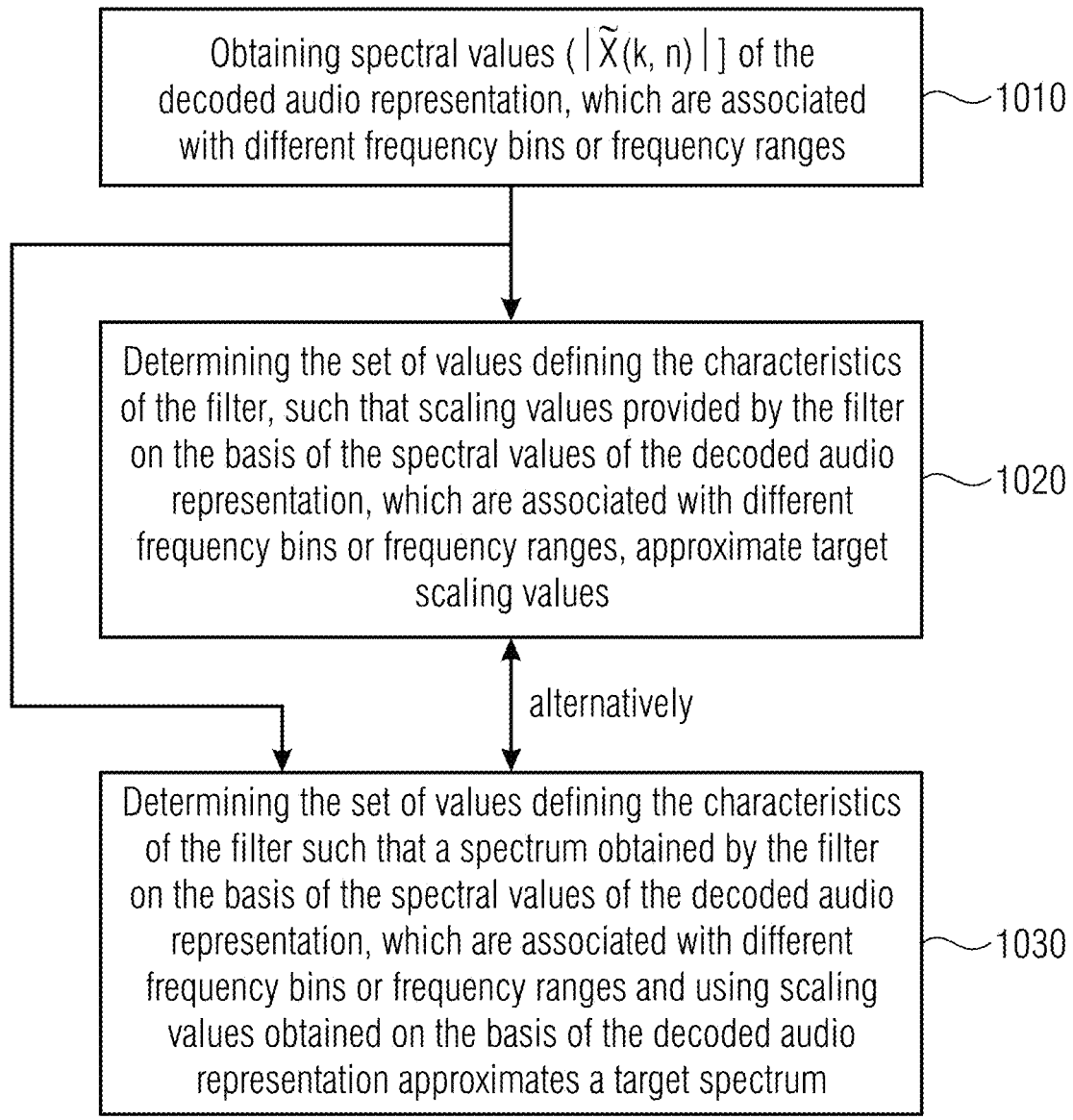

Table 1 shows a representation of a percentage of mask values that lie in an interval (0, 1) for a different signal-to-noise ratio (SNR);

Table 2 shows a representation of a percentage of mask values in different threshold regions measured at lowest three bitrates of AMR-WB;

FIG. 6 shows a schematic representation of a fully connected neural network (FCNN) that maps log-magnitude to real-valued masks;

FIG. 7 shows a graphic representation of average PESQ and POLQA scores evaluating an Oracle experiment with different bounds of the mask at 6.65 kbps;

FIG. 8 shows a graphic representation of average PESQ and POLQA scores evaluating the performance of proposed methods and EVS post-processor;

FIG. 9 shows a flowchart of a method, according to an embodiment of the present invention; and FIG. 10 shows a flowchart of a method, according to an embodiment of the present invention.

5. DETAILED DESCRIPTION OF THE INVENTION

Figure 1:
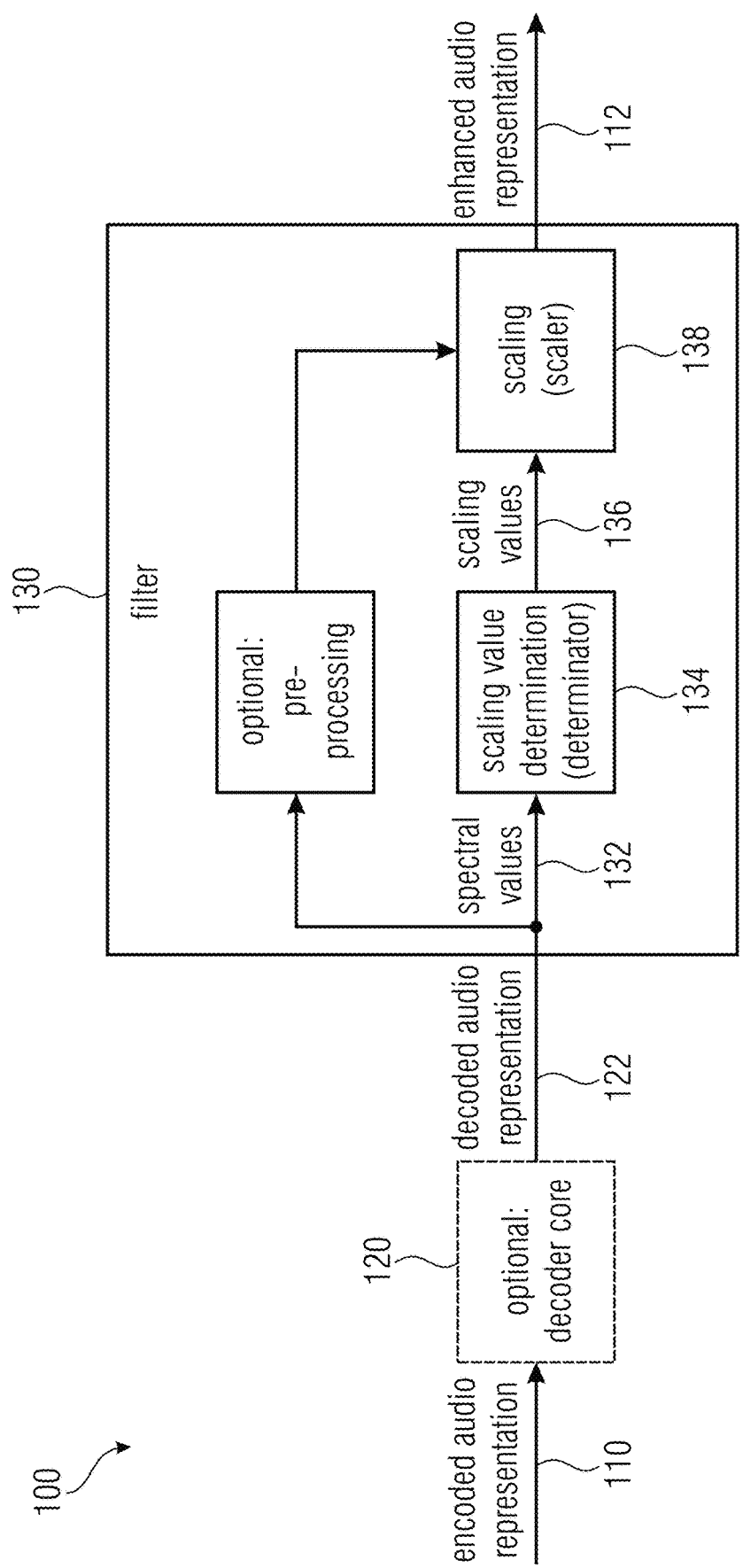
FIG. 1 shows a block schematic diagram of an audio decoder, according to an embodiment of the present invention.

1) Audio Decoder According to FIG. 1

FIG. 1 shows a block schematic diagram of an audio decoder 100, according to an embodiment of the present invention. The audio decoder 100 is configured to receive an encoded audio representation 110 and to provide, on the basis thereof, an enhanced audio representation 112, which may be an enhanced form of a decoded audio representation.

The audio decoder 100 optionally comprises a decoder core 120, which may receive the encoded audio representation 110 and provide, on the basis thereof, a decoded audio representation 122. The audio decoder further comprises a filter 130, which is configured to provide the enhanced audio representation 112 on the basis of the decoded audio representation 122. The filter 130, which may be considered as a post-filter, is configured to obtain a plurality of scaling values 136, which are associated with different frequency bins or frequency ranges, on the basis of spectral values 132 of the decoded audio representation, which are also associated with different frequency bins or frequency ranges. For example, the filter 130 may comprise a scaling value determination or a scaling value determinator 134 which receives the spectral values 132 of the decoded audio representation and which provides the scaling values 136. The filter 130 is further configured to scale spectral values of the decoded audio signal representation, or a pre-processed version thereof, using the scaling values 136, to obtain the enhanced audio representation 112.

It should be noted that the spectral values of the decoded audio representation, which are used to obtain the scaling values, may be identical to the spectral values which are actually scaled (for example, by the scaling or scaler 138), or may be different from the spectral values which are actually scaled. For example, a first subset of the spectral values of the decoded audio representation may be used for the determination of the scaling values, and a second subset of the spectral values of the spectrum or amplitude spectrum or absolute spectrum or norm spectrum may be actually scaled. The first subset and the second subset may be equal, or may overlap partially, or may even be completely different (without any common spectral values).

Regarding the functionality of the audio decoder 100, it can be said that the audio decoder 100 provides a decoded audio representation 122 on the basis of the encoded audio representation. Since the encoding (i.e. the provision of the encoded audio representation) is typically lossy, the decoded audio representation 122 provided, for example, by the decoder core may comprise some degradations when compared to an original audio content (which may be fed into an audio encoder providing the encoded audio representation 110). It should be noted that the decoded audio representation 122 provided, for example, by the decoder core, may take any form and may, for example, be provided by the decoder core in the form of a time domain representation or in the form of a spectral domain representation. A spectral domain representation may, for example, comprise (discrete) Fourier Transform coefficients or (discrete) MDCT coefficients, or the like.

The filter 130 may, for example, obtain (or receive) spectral values representing the decoded audio representation. However, the spectral values used by the filter 130 may, for example, be of a different type when compared to the spectral values provided by the decoder core. For example, the filter 130 may use Fourier coefficients as the spectral values, while the decoder core 120 originally only provides MDCT coefficients. Also, the filter 130 may, optionally, derive the spectral values from a time domain representation of the decoded audio representation 120, for example, by a Fourier transform or MDCT transform or the like (for example, a short-time-Fourier-transform STFT).

The scaling value determination 134 derives the scaling values 136 from a plurality of spectral values of the decoded audio representation (e.g. derived from the decoded audio representation). For example, the scaling value determination 134 may comprise a neural network or a machine-learning structure, which receives the spectral values 132 and derives the scaling values 136. Moreover, spectral values of the enhanced audio representation 112 may be obtained by scaling spectral values of the decoded audio representation (which may be equal to or different from the spectral values used by the scaling value determination 134) in accordance with the scaling values 136. For example, the scaling values 136 may define a scaling of spectral values in different frequency bins or frequency ranges. Moreover, it should be noted that the scaling 136 may operate on complex-valued spectral values, or on real-valued spectral values (for example, amplitude values or magnitude values or norm values).

Accordingly, when using an appropriate determination of the scaling values 136 on the basis of the spectral values 132 of the decoded audio representation, the scaling 138 may counteract a degradation of an audio quality caused by the lossy encoding used to provide the encoded audio representation 110.

For example, the scaling 138 may reduce a quantization noise, for example by selectively attenuating spectral bins or spectral ranges comprising a high quantization noise. Alternatively or in addition, the scaling 138 may also result in a smoothing of a spectrum over time and/or over frequency, which can also help to reduce quantization noise and/or to improve a perceptual impression.

However, it should be noted that the audio decoder 100 according to FIG. 1 can optionally be supplemented by any of the features, functionalities and details disclosed herein, both individually and in combination.

Figure 2:
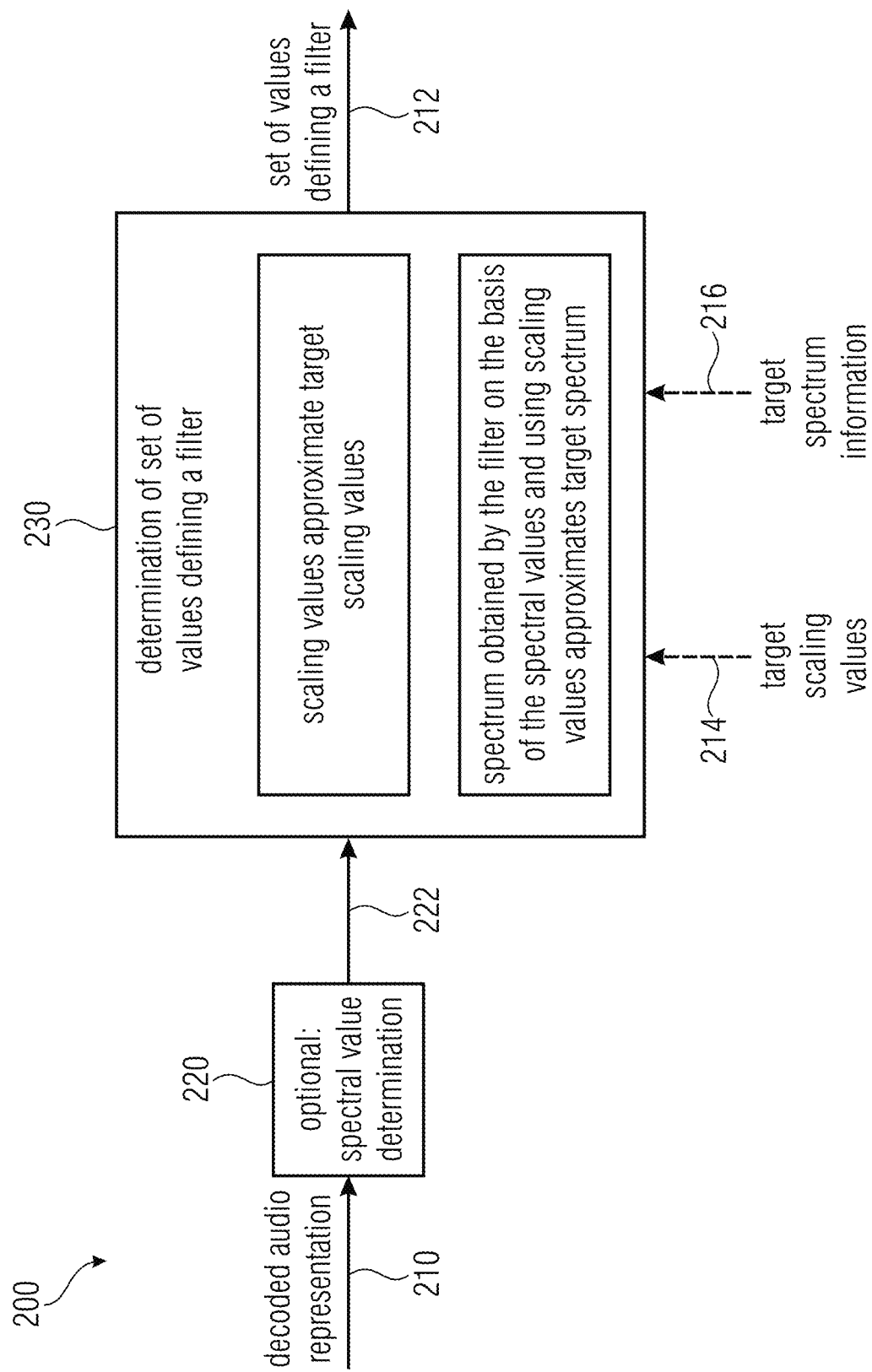
FIG. 2 shows a block schematic diagram of an apparatus for determining a set of values defining characteristics of a filter, according to an embodiment of the present invention.

2) Apparatus According to FIG. 2

FIG. 2 shows a block schematic diagram of an apparatus 200 for determining a set of values (e.g. coefficients of a neural network, or coefficients of another machine-learning structure) defining characteristics of a filter (e.g., a neural-network based filter, or a filter based on another machine-learning structure).

The apparatus 200 according to FIG. 2 is configured to receive a decoded audio representation 210 and to provide, on the basis thereof, a set 212 of values defining a filter, wherein the set 212 of values defining a filter may, for example, comprise coefficients of a neural network or coefficients of another machine-learning structure. Optionally, the apparatus 200 may receive target scaling values 214 and/or a target spectrum information 216. However, the apparatus 200 may, optionally, itself generate the target scaling values and/or the target spectrum information 216.

It should be noted that the target scaling values may, for example, describe scaling values which bring the decoded audio representation 210 close (or closer) to an ideal (undistorted) state. For example, the target scaling values may be determined on the basis of a knowledge of a reference audio representation, from which the decoded audio representation 210 is derived by an encoding and a decoding. For example, it can be derived from a knowledge of spectral values of the reference audio representation and from a knowledge of spectral values of the decoded audio representation which scaling causes the enhanced audio representation (which is obtained on the basis of the spectral values of the decoded audio representation using the scaling) to approximate the reference audio representation.

Moreover, the target spectrum information 216 may, for example, be based on a knowledge of the reference audio representation, from which the decoded audio representation is derived by an encoding and a decoding. For example, the target spectrum information may take the form of spectral values of the reference audio representation.

As can be seen in FIG. 2, the apparatus 200 may optionally comprise a spectral value determination, in which the spectral values of the decoded audio representation 210 are derived from the decoded audio representation 210. The spectrum value determination is designated with 220, and the spectral values of the decoded audio representation are designated with 222. However, it should be noted that the spectral values determination 220 should be considered as being optional, since the decoded audio representation 210 may directly be provided in the form of spectral values.

The apparatus 200 also comprises a determination 230 of a set of values defining a filter. The determination 230 may receive, or obtain, the spectral values 222 of the decoded audio representation and provide, on the basis thereof, the set 212 of values defining a filter. The determination 230 may optionally use the target scaling values 214 and/or the target spectrum information 216.

Regarding the functionality of the apparatus 200, it should be noted that the apparatus 200 is configured to obtain the spectral values 222 of the decoded audio representation, which are associated with different frequency bins or frequency ranges. Moreover, the determination 230 may be configured to determine the set 212 of values defining the characteristics of the filter, such that scaling values provided by the filter on the basis of the spectral values 222 of the decoded audio representation, which are associated with different frequency bins or frequency ranges, approximate target scaling values (for example, the target scaling values 214). As mentioned, the target scaling values may be computed on the basis of a comparison of a desired enhanced audio representation and the decoded audio representation, wherein the desired enhanced audio representation may correspond to the reference audio representation mentioned before. Worded differently, the determination 230 may determine and/or optimize a set of values (for example, a set of coefficients of a neural network, or a set of coefficients of another machine-learning structure) defining characteristics of a filter (for example, of a neural-network based filter, or of a filter based on another machine-learning structure), such that this filter provides scaling values on the basis of spectral values of the decoded audio representation which approximate the target scaling values 214. The determination of the set 214 of values defining the filter may be done using a single-pass forward computation, but may typically be performed using an iterative optimization. However, any known training procedures for neural networks or for computer-learning structures may be used.

Alternatively, the determination 230 of the set 212 of values defining a filter may be configured to determine the set 212 of values defining the characteristics of the filter, such that a spectrum obtained by the filter on the basis of the spectral values of the decoded audio representation (which are associated with different frequency bins or frequency ranges) and using the scaling values obtained on the basis of the decoded audio representation approximates a target spectrum (which may, for example, be described by the target spectrum information 216). In other words, the determination 230 may select the set 212 of values defining the filter such that the filtered version of the spectral values of the decoded audio representation 210 approximates spectral values described by the target spectrum information 216. To conclude, the apparatus 200 may determine the set 212 of values defining a filter such that the filter at least partially approximates spectral values of the decoded audio representation to "ideal" or "reference" or "target" spectral values. For this purpose, the apparatus typically uses decoded audio representations representing different audio content. By determining the set 212 of values defining a filter on the basis of different audio content (or different types of audio contents), the set 212 of values defining a filter can be chosen such that the filter performs reasonably well for audio contents which are different from the reference audio contents used for the training of the set 212 of values defining the filter.

Thus, it can be achieved that the set 212 of values defining the filter is well-suited for enhancing a decoded audio representation obtained in an audio decoder, for example, in the audio decoder 100 according to FIG. 1. In other words, the set 212 of values defining a filter can be used, for example, in the audio decoder 100 to define the operation of the scaling value determination 134 (and, consequently, to define the operation of the filter 130).

However, it should be noted that the apparatus 200 according to FIG. 2 can optionally be supplemented by any of the features, functionalities and details described herein, both individually and taken in combination.

Figure 3A:
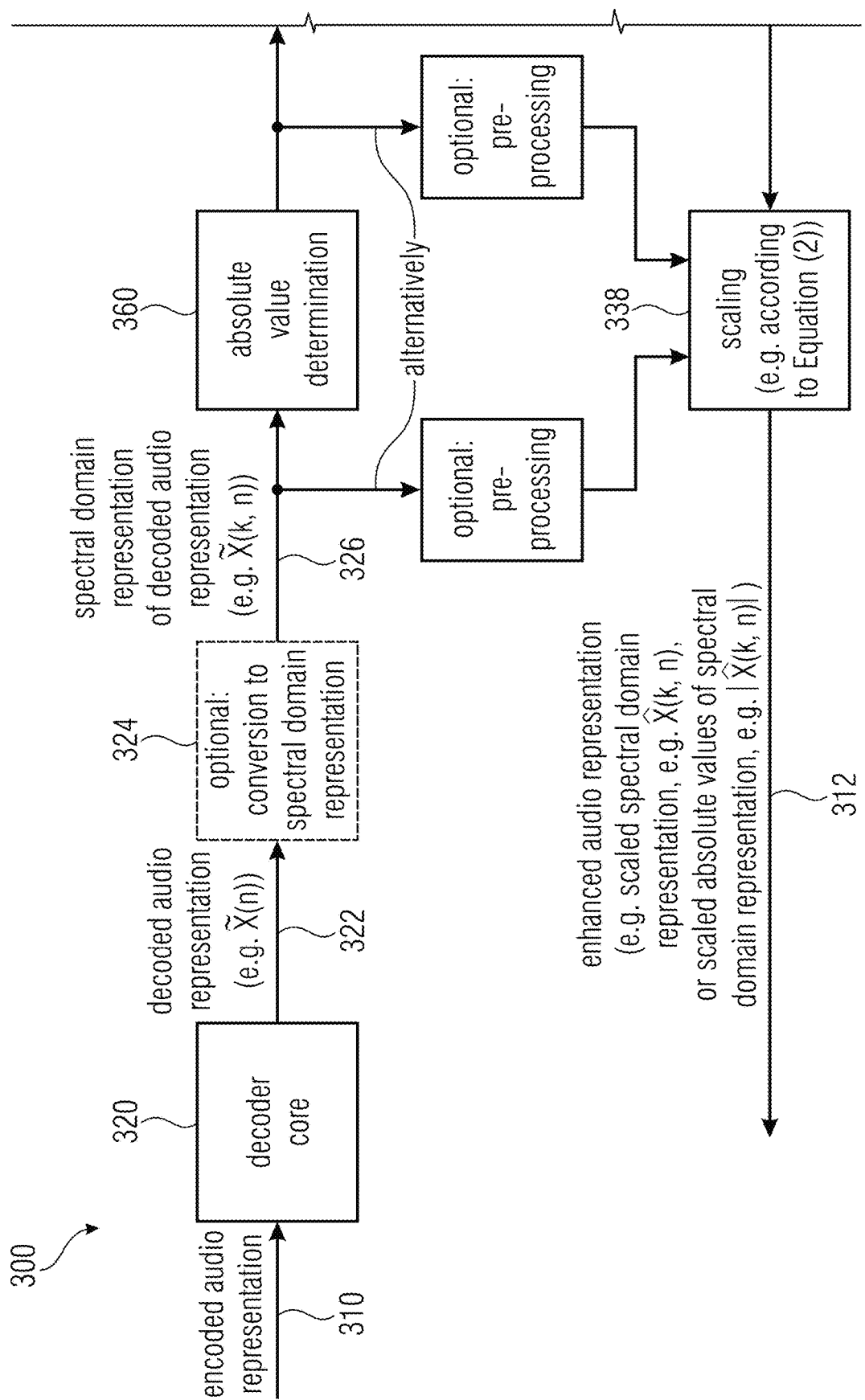
FIG. 3 shows a block schematic diagram of an audio decoder, according to an embodiment of the present invention.
Figure 3B:
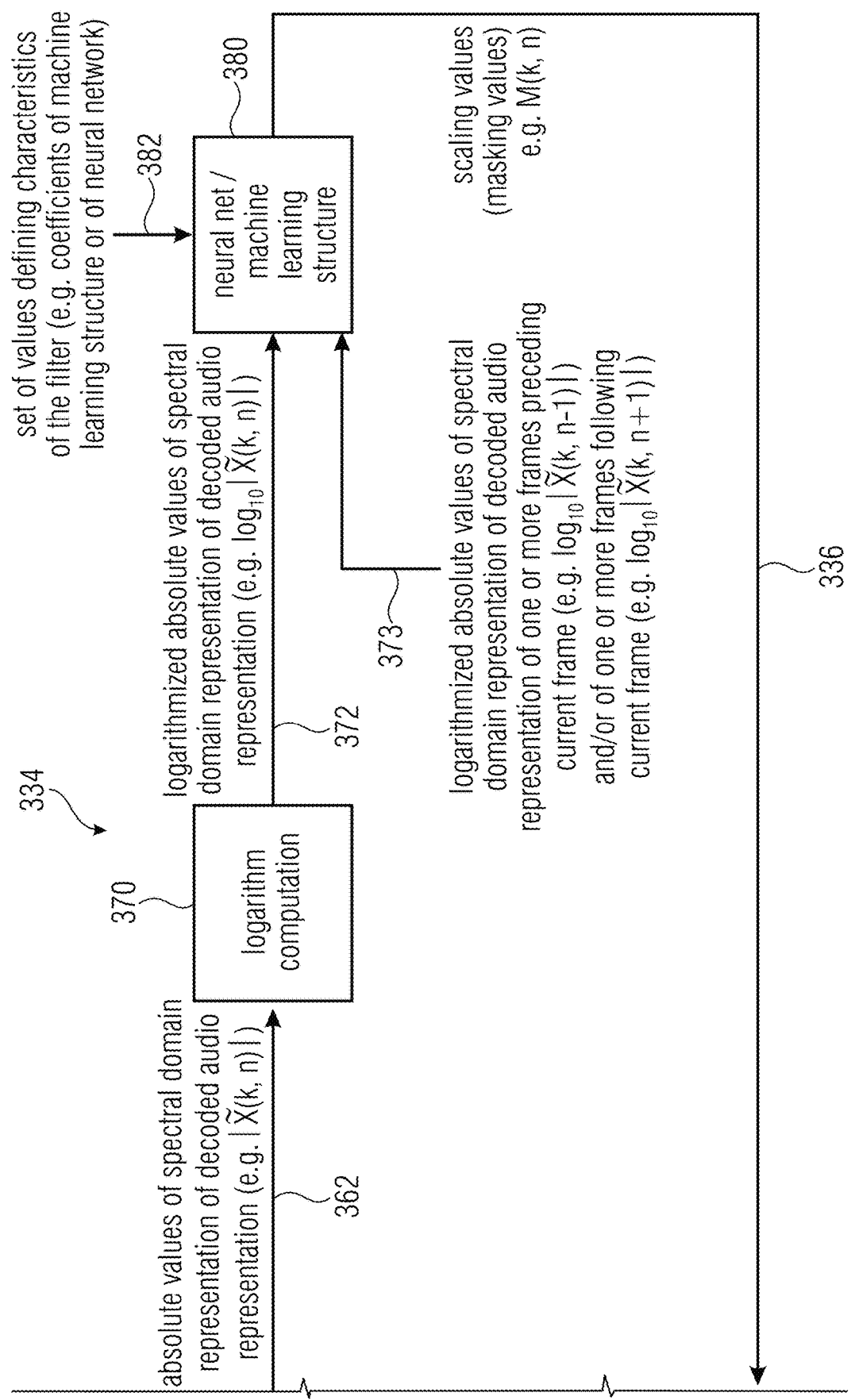

3) Audio Decoder 300 According to FIG. 3

FIG. 3 shows a block schematic diagram of an audio decoder 300, according to another embodiment of the present invention. The audio decoder 300 is configured to receive an encoded audio representation 310, which may correspond to the encoded audio representation 110, and to provide, on the basis thereof, an enhanced audio representation 312, which may correspond to the enhanced audio representation 112. The audio decoder 300 comprises a decoder core 320, which may correspond to the decoder core 120. The decoder core 320 provides a decoded audio representation 322 (which may correspond to the decoded audio representation 122) on the basis of the encoded audio representation 310. The decoded audio representation may be in a time domain representation, but may also be in a spectral domain representation.

Optionally, the audio decoder 300 may comprise a conversion 324, which may receive the decoded audio representation 322 and provide a spectral domain representation 326 on the basis of the decoded audio representation 322. This conversion 324 may, for example, be useful if the decoded audio representation does not take the form of spectral values associated with different frequency bins or frequency ranges. For example, the conversion 324 may convert a decoded audio representation 322 into a plurality of spectral values if the decoded audio representation 322 is in a time domain representation. However, the conversion 324 may also perform a conversion from a first type of spectral domain representation to a second type of spectral domain representation in case the decoder core 320 does not provide spectral values useable by the subsequent processing stages. The spectral domain representation 326 may, for example, comprise the spectral values 132 as shown in the audio decoder 100 of FIG. 1.

Moreover, the audio decoder 300 comprises a scaling value determination 334, which, for example, comprises an absolute value determination 360, a logarithmic computation 370 and a neural net or machine-learning structure 380. The scaling value determination 334 provides scaling values 336 on the basis of the spectral values 326, which may correspond to the spectral values 132.

The audio decoder 300 also comprises a scaling 338, which may correspond to the scaling 138. In the scaling, spectral values of the decoded audio representation, or a preprocessed version thereof, are scaled in dependence on scaling values 336 provided by the neural net/machine-learning structure 380. Accordingly, the scaling 338 provides the enhanced audio representation.

The scaling value determination 334 and the scaling 338 may be considered as a filter or "post-filter".

In the following, some further details will be described.

The scaling value determination 334 comprises the absolute value determination 360. The absolute value determination 360 may receive the spectral domain representation 326 of the decoded audio representation, for example, $\tilde{X}(k,n)$. The absolute value determination 360 may then provide absolute values 362 of the spectral domain representation 326 of the decoded audio representation. The absolute values 362 may, for example, be designated with $|\tilde{X}(k,n)|$.

The scaling value determination also comprises a logarithm computation 370, which receives the absolute values 362 of the spectral domain representation of the decoded audio representation (e.g., a plurality of absolute values of spectral values) and provides, on the basis thereof logarithmized absolute values 372 of the spectral domain representation of the decoded audio representation. For example, the logarithmized absolute values 372 may be designated with $\log_{10}|\tilde{X}(k,n)|$.

It should be noted that the absolute value determination 360 may, for example, determine absolute values or magnitude values or norm values of a plurality of spectral values of the spectral domain representation 326, such that, for example, signs or phases of the spectral values are removed. The logarithm computations, for example, compute a common logarithm (with base 10) or a natural logarithm, or any other logarithm which may be appropriate. Also, it should be noted that the logarithm computation may optionally be replaced by any other computation which reduces a dynamic range of the spectral values 362. Moreover, it should be known that the logarithm computation 370 may comprise a limitation of negative and/or positive values, such that the logarithmized absolute values 372 may be limited to a reasonable range of values.

The scaling value determination 334 also comprises a neural network or a machine-learning structure 380, which receives the logarithmized absolute values 372 and which provides, on the basis thereof, the scaling values 332. The neural net or machine-learning structure 380 may, for example, be parametrized by a set 382 of values defining characteristics of the filter. The set of values may, for example, comprise coefficients of a machine-learning structure or coefficients of a neural network. For example, the set of values 382 may comprise branch-weights of a neural network and optionally also parameters of an activation function. The set of values 382 may, for example, be determined by the apparatus 200, and the set of values 382 may, for example, correspond to the set of values 212.

Moreover, the neural net or machine-learning structure 380 may optionally also comprise logarithmized absolute values of a spectral domain representation of the decoded audio representation for one or more frames preceding a current frame and/or for one or more frames following the current frame. In other words, the neural net or machine-learning structure 380 may not only use logarithmized absolute values of spectral values associated with a currently processed frame (for which the scaling values are applied), but may also consider the logarithmized absolute values of spectral values of one or more preceding frames and/or of one or more subsequent frames. Thus, the scaling values associated with a given (currently processed) frame may be based on spectral values of the given (currently processed) frame and also on spectral values of one or more preceding frames and/or of one or more subsequent frames.

For example, the logarithmized absolute values of the spectral domain representation of the decoded audio representation (designated with 372) may be applied to inputs (e.g. input neurons) of the neural network or machine-learning structure 380. The scaling values 336 may be provided by outputs of the neural net or machine-learning structure 380 (for example, by output neurons). Moreover, the neural net or the machine-learning structure may perform a processing in accordance with the set of values 382 defining the characteristics of the filter.

The scaling 338 may receive the scaling values 336, which may also be designated as "masking values" and which may, for example, be designated with M(k,n), and also spectral values, or preprocessed spectral values of a spectral domain representation of the decoded audio representation. For example, the spectral values which are input into the scaling 338 and which are scaled in accordance with the scaling values 336 may be based on the spectral domain representation 326 or may be based on the absolute values 362, wherein, optionally, a preprocessing may be applied before the scaling 338 is performed. The preprocessing may, for example, comprise a filtering, for example in the form of a fixed scaling or a scaling determined by a side information of the encoded audio information. However, the preprocessing may also be fixed an may be independent form a side information of the encoded audio representation. Moreover, it should be noted that the spectral values which are input into the scaling 338 and which are scaled using the scaling values 336 do not necessarily need to be identical to the spectral values which are used for the derivation of the scaling values 336.

Accordingly, the scaling 338 may, for example, multiply the spectral values which are input into the scaling 338 with the scaling values, wherein different scaling values are associated with different frequency bins or frequency ranges. Accordingly, the enhanced audio representation 312 is obtained, wherein the enhanced audio representation may, for example, comprise a scaled spectral domain representation (e.g. $\hat{X}(k,n)$ or scaled absolute values of such a spectral domain representation (e.g. $|\tilde{X}(k,n)|$). Thus, the scaling 338 may, for example, be performed using a simple multiplication between spectral values associated with the decoded audio representation 322 and associated scaling values provided by the neural network or machine-learning structure 380.

To conclude, the apparatus 300 provides an enhanced audio representation 312 on the basis of the encoded audio representation 310, wherein a scaling 338 is applied to spectral values which are based on the decoded audio representation 322 provided by the decoder core 320. The scaling values 336, which are used in the scaling 338, are provided by a neural net or by a machine-learning structure, wherein input signals of the neural network or of the machine-learning structure 380 are obtained by logarithmizing absolute values of spectral values which are based on the decoded audio representation 322. However, by an appropriate choice of the set of values 382 defining the characteristics of the filter, the neural network or the machine-learning structure can provide the scaling values in such a manner that the scaling 338 improves the hearing impression of the enhanced audio representation when compared to the decoded audio representation.

Moreover, it should be noted that the audio decoder 300 can optionally be supplemented by any of the features, functionalities and details described herein.

Figure 4A:
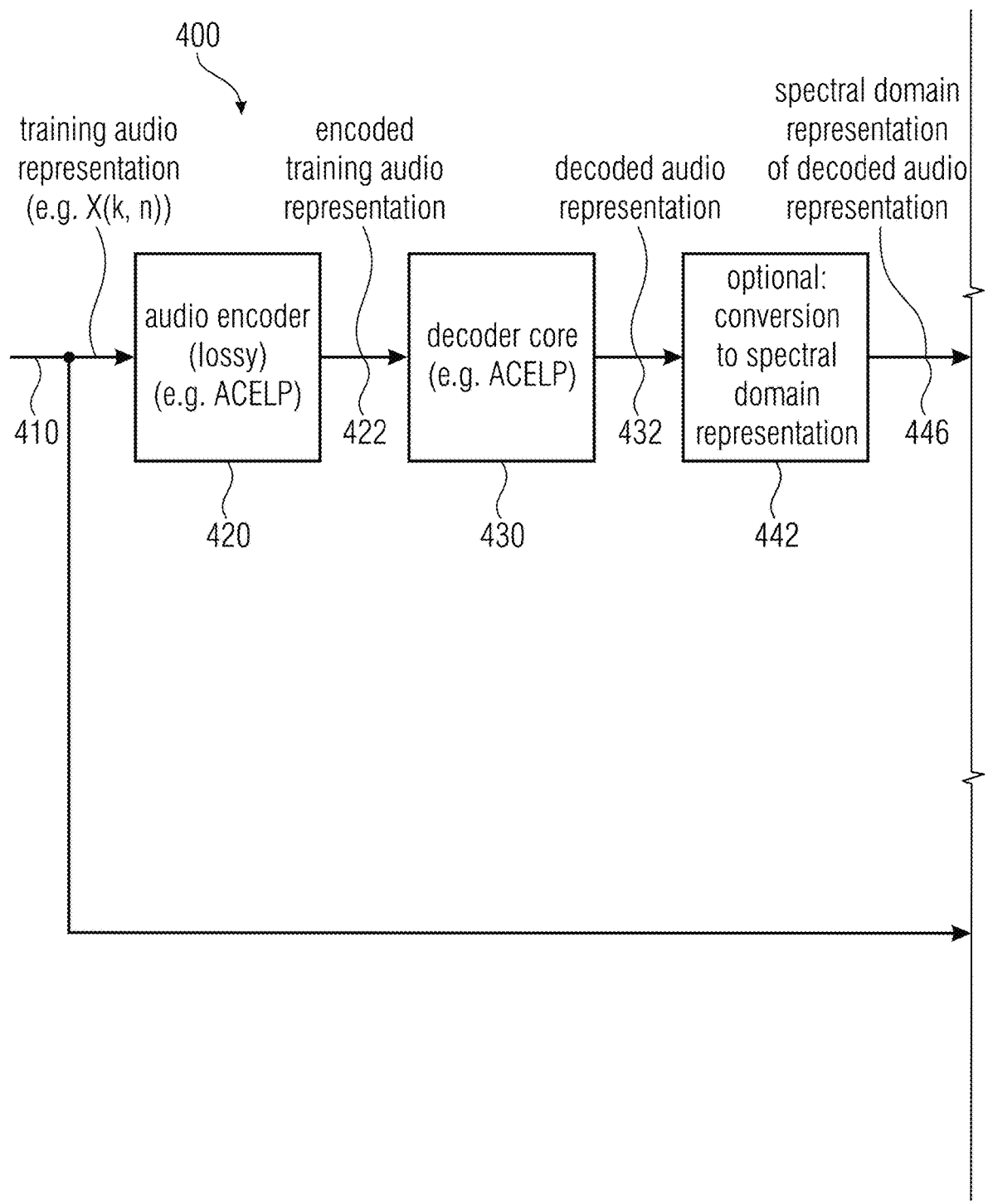
FIG. 4 shows a block schematic diagram of an apparatus for determining a set of values defining characteristics of a filter, according to an embodiment of the present invention.
Figure 4B:
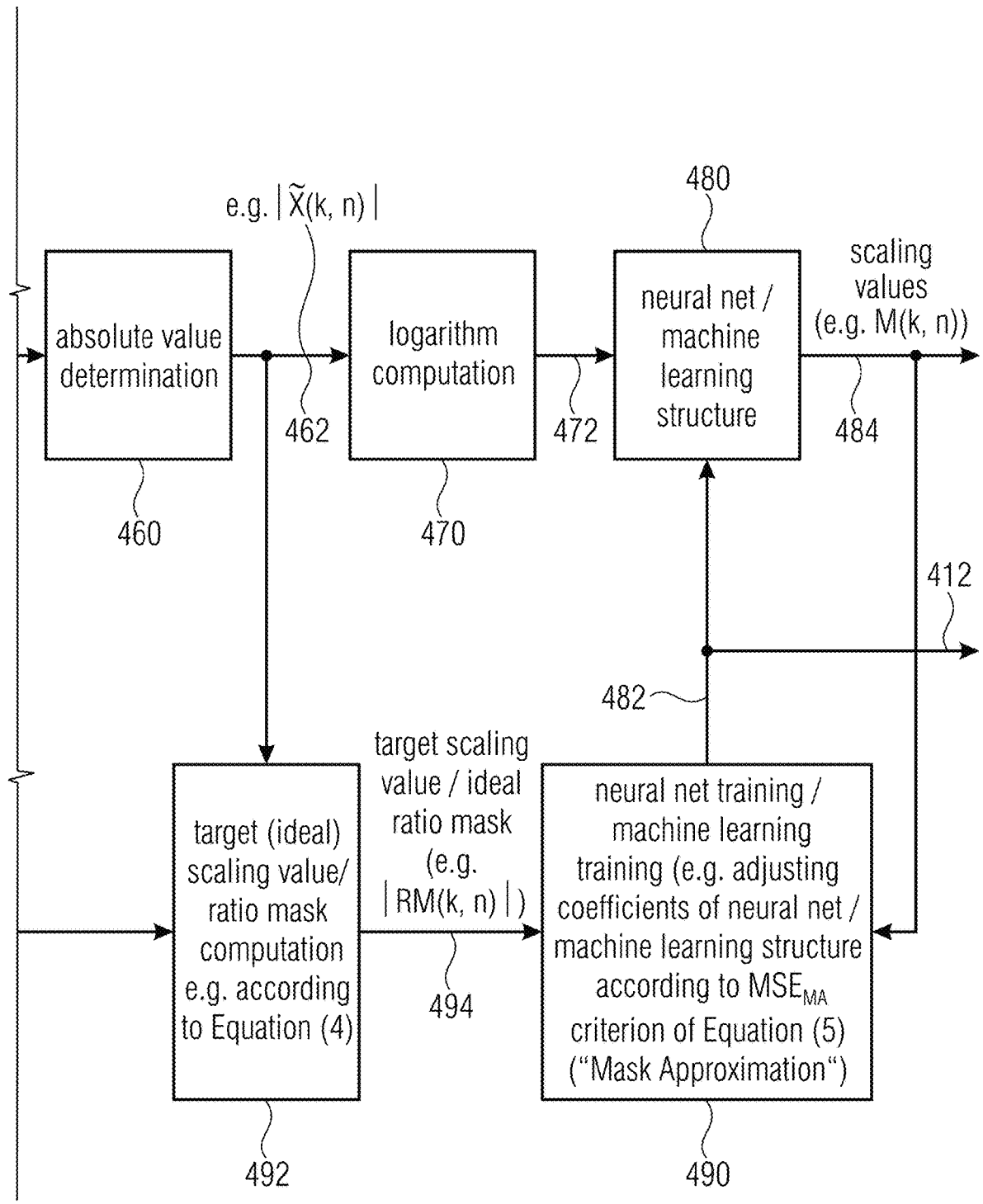

4) Apparatus According to FIG. 4

FIG. 4 shows a block schematic diagram of an apparatus 400 for determining a set of values (e.g. coefficients of a neural network or coefficients of another machine-learning structure) defining characteristics of a filter. The apparatus 400 is configured to receive a training audio representation 410 and to provide, on the basis thereof, a set of values 412 defining characteristics of a filter. It should be noted that the training audio representation 410 may, for example, comprise different audio content which is used for the determination of the set of values 412.

The apparatus 400 comprises an audio encoder 420, which is configured to encode the training audio representation 410, to thereby obtain an encoded training audio representation 422. The apparatus 400 also comprises a decoder core 430, which receives the encoded training audio representation 422 and provides, on the basis thereof, a decoded audio representation 432. It should be noted that decoder core 420 may, for example, be identical to the decoder core 320 and to the decoder core 120. The decoded audio representation 432 may also correspond to the decoded audio representation 210.

The apparatus 400 also comprises, optionally, a conversion 442 which converts the decoded audio representation 432, which is based on the training audio representation 410, into a spectral domain representation 446. The conversion 442 may, for example, correspond to the conversion 324, and the spectral domain representation 446 may, for example, correspond to the spectral domain representation 326. The apparatus 400 also comprises an absolute value determination 460, which receives the spectral domain representation 446 and provides, on the basis thereof, absolute values 462 of the spectral domain representation. The absolute value determination 460 may, for example, correspond to the absolute value determination 360. The apparatus 400 also comprises a logarithm computation 470, which receives the absolute values 462 of the spectral domain representation and provides, on the basis thereof, logarithmized absolute values 472 of the spectral domain representation of the decoded audio representation. The logarithm computation 470 may correspond to the logarithm computation 370.

Moreover, the apparatus 400 also comprises a neural net or machine-learning structure 480, which corresponds to the neural net or machine-learning structure 380. However, the coefficients of the machine-learning structure or neural net 480, which are designated with 482, are provided by a neural net training/machine-learning training 490. It should be noted here that the neural network/machine-learning structure 480 provides the scaling values, which the neural net/machine-learning structure derives on the basis of the logarithmized absolute values 372, to the neural net training/machine-learning training 490.

The apparatus 400 also comprises a target scaling value computation 492, which is also designated as "ratio mask computation". For example, the target scaling value computation 492 receives the training audio representation 410 and the absolute values 462 of the spectral domain representation of the decoded audio representation 432. Accordingly, the target scaling value computation 492 provides a target scaling value information 494, which describes desired scaling values which should be provided by the neural net/machine-learning structure 480. Accordingly, the neural net training/machine-learning training 490 compares the scaling values 484 provided by the neural net/machine-learning structure 480 with the target scaling values 494 provided by the target scaling value computation 492 and adjusts the values 482 (i.e., the coefficients of the machine-learning structure or of the neural network) to reduce (or minimize) a deviation between the scaling values 484 and the target scaling values 494.

In the following, an overview of the functionality of the apparatus 400 will be provided. By encoding and decoding the training audio representation (which may, for example, comprise different audio contents) in the audio encoder 420 and in the audio decoder 430, the decoded audio representation 432 is obtained, which typically comprises some degradation when compared to the training audio representation due to losses in the lossy encoding. The target scaling value computation 492 determines which scaling (e.g. which scaling values) should be applied to the spectral values of the decoded audio representation 432 such that scaled spectral values of the decoded audio representation 432 well-approximate spectral values of the training audio representation. It is assumed that the artifacts introduced by the lossy encoding can at least partially be compensated by applying a scaling to the spectral values of the decoded audio representation 432. Consequently, the neural net or machine-learning structure 480 is trained by the neural net training/machine-learning training such that the scaling values 482 provided by the neural net/machine-learning structure 480 on the basis of the decoded audio representation 432 approximate the target scaling values 494. The optional conversion 442, the absolute value determination 460 and the logarithm computation 470 merely constitute (optional) preprocessing steps to derive the input values 472 (which are logarithmized absolute values of spectral values of the decoded audio representation) for the neural network or machine-learning structure 480.

The neural net training/machine-learning training 490 may use an appropriate learning mechanism (for example, an optimization procedure) in order to adjust the coefficients 482 of the machine-learning structure or of the neural network such that a difference (for example, a weighted difference) between the scaling values 484 and the target scaling values 494 is minimized or brought below a threshold value or at least reduced.

Accordingly, coefficients 482 of the machine-learning structure or of the neural network (or, generally speaking, a set of values defining characteristics of the filter) are provided by the apparatus 400. These values can be used in the filter 130 (to adjust the scaling value determination 134) or in the apparatus 300 (to adjust the neural net/machine-learning structure 380).

However, it should be noted that the apparatus 400 can optionally be supplemented by any of the features, functionalities and details described herein.

5. Apparatus According to FIG. 5

Figure 5A:
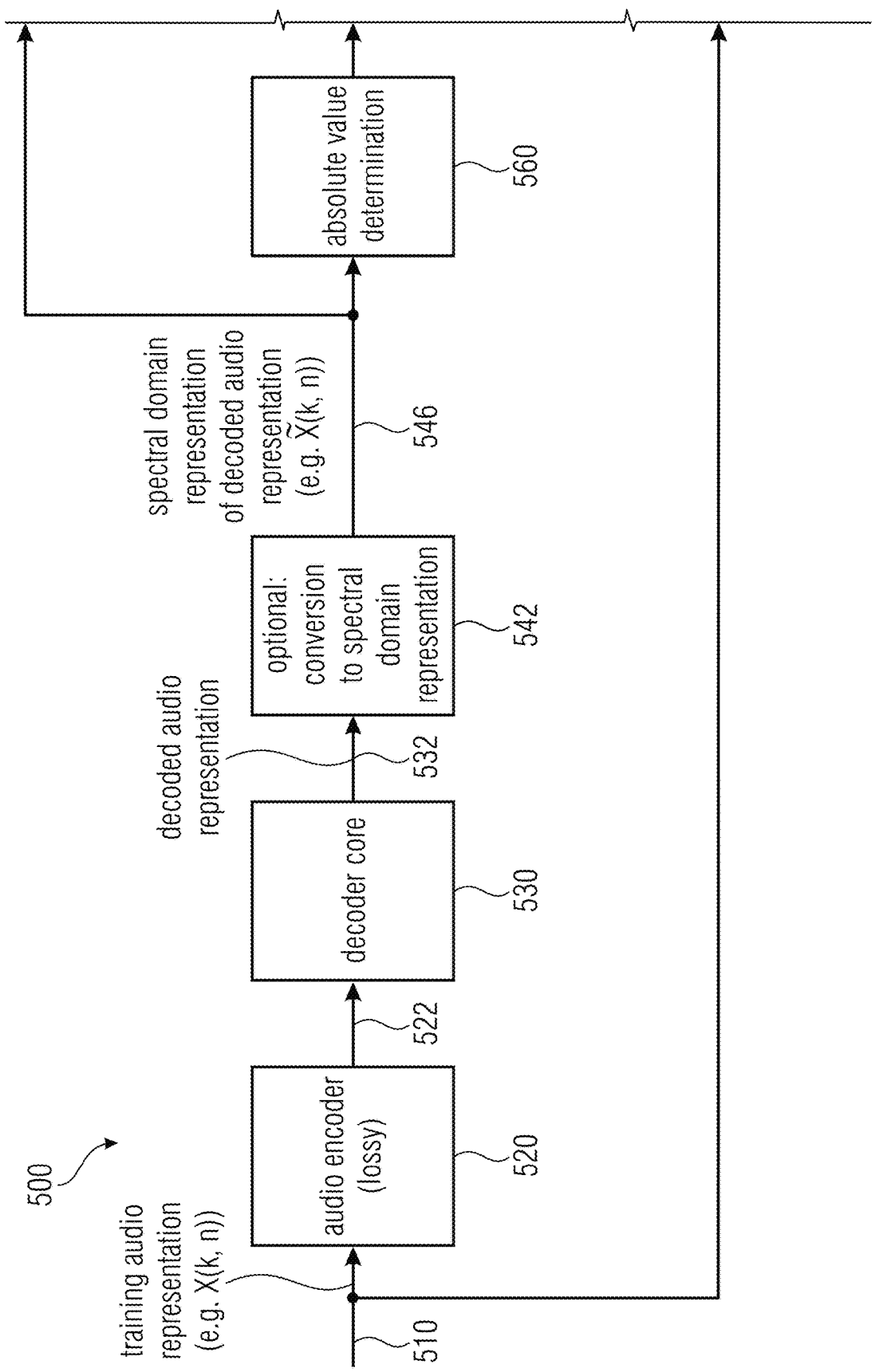
FIG. 5 shows a block schematic diagram of an apparatus for determining a set of values defining characteristics of a filter, according to an embodiment of the present invention.
Figure 5B:
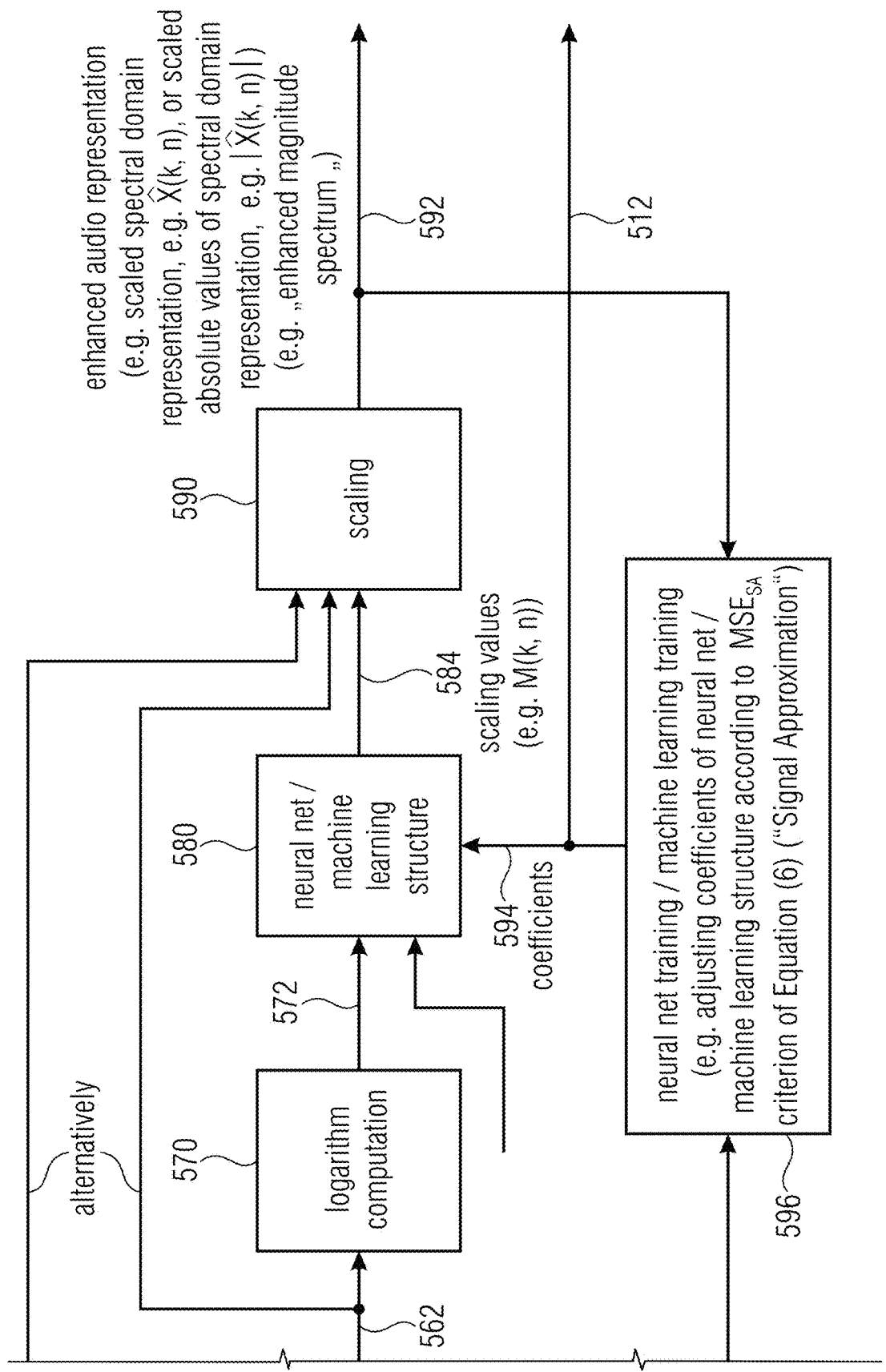

FIG. 5 shows a block schematic diagram of an apparatus 500 for determining a set 512 of values defining a filter, wherein the values 512 may be, for example, the coefficients of a machine-learning structure or of a neural network.

It should be noted that the apparatus 500 is similar to the apparatus 400, such that identical features, functionalities and details will not be outlined again. Rather, reference is made to the above explanations.

The apparatus 500 receives a training audio representation 510 which may, for example, correspond to the training audio representation 410. The apparatus 500 comprises an audio encoder 520, which corresponds to the audio encoder 420 and which provides an encoded training audio representation 522 which corresponds to the encoded training audio representation 422. The apparatus 500 also comprises a decoder core 530, which corresponds to the decoder core 430 and provides a decoded audio representation 532.

The apparatus 500 optionally comprises a conversion 542, which corresponds to the conversion 442 and which provides a spectral domain representation (for example, in the form of spectral values) of the decoded audio representation 552. The spectral domain representation is designated with 546 and corresponds to the spectral domain representation 446. Moreover, the apparatus 500 comprises an absolute value determination 560 which corresponds to the absolute value determination 460. The apparatus 500 also comprises a logarithm computation 570, which corresponds to the logarithm computation 470. Furthermore, the apparatus 500 comprises a neural net or machine-learning structure 580 which corresponds to the machine-learning structure 480. However, the apparatus 500 also comprises a scaling 590, which is configured to receive spectral values 546 of the decoded audio representation or absolute values 562 of spectral values of the decoded audio representation. The scaling also receives the scaling values 584 provided by the neural net 580. Accordingly, the scaling 590 scales the spectral values of the decoded audio representation or the absolute values of the spectral values of the audio representation, to thereby obtain an enhanced audio representation 592. The enhanced audio representation 592 may, for example, comprise scaled spectral values (e.g. $\hat{X}(k,n)$) or scaled absolute values of spectral values (e.g. $|\hat{X}(k,n)|$). In principle, enhanced audio representation 592 may correspond to the enhanced audio representation 112 provided by the apparatus 100 and to the enhanced audio representation 312 provided by the apparatus 300. Insofar, the functionality of the apparatus 500 may correspond to the functionality of the apparatus 100 and/or to the functionality of the apparatus 300, except for the fact that the coefficients of the neural net or of the machine-learning structure 580, which are designated with 594, are adjusted by a neural net training/machine-learning training 596. For example, the neural net training/machine-learning training 596 may receive the training audio representation 510 and also the enhanced audio representation 592 and may adjust the coefficients 594 such that the enhanced audio representation 592 approximates the training audio representation.

It should be noted here that, if the enhanced audio representation 592 approximates the training audio representation 510 with a good accuracy, signal degradations caused by the lossy encoding are at least partially compensated by the scaling 590. Worded yet differently, the neural net training 596 may, for example, determine a (weighted) difference between the training audio representation 510 and the enhanced audio representation 592 and adjust the coefficients 594 of the machine-learning structure or of the neural network 580 in order to reduce or minimize this difference. The adjustment of the coefficients 594 may, for example, be performed in an iterative procedure.

Accordingly, it can be reached that the coefficients 594 of the neural net or machine-learning structure 580 are adapted such that, in a normal operation, a machine-learning structure or neural net 380 using the determined coefficients 594 can provide scaling values 336 which result in a good quality enhanced audio representation 312.

Worded yet differently, the coefficients 482, 594 of the neural net or machine-learning structure 480 or of the neural net or machine-learning structure 580 can be used in the neural net 380 of the apparatus 300, and it can be expected that the apparatus 300 provides a high quality enhanced audio representation 312 in this situation. Of course, this functionality is based on the assumption that the neural net/machine-learning structure 380 is similar or even identical to the neural net/machine-learning structure 480 or to the neural net/machine-learning structure 580.

Moreover, it should be noted that the coefficients 482, 412 or the coefficients 594, 512 can also be used in the scaling value determination 134 of the audio decoder 100.

Moreover, it should be noted that the apparatus 500 can optionally be supplemented by any of the features, functionalities and details described herein, both individually and taken in combination.

6). Details and Embodiments

In the following, some considerations underlying the present invention will be discussed and several solutions will be described. In particular, a number of details will be disclosed, which can optionally be introduced into any of the embodiments disclosed herein.

6.1 Problem Formulation 6.1.1 Ideal Ratio Mask (IRM)

From a very simplistic mathematical point of view, one can describe the coded speech $\hat{x}(n)$, e.g., a decoded speech provided by a decoder core, (e.g., the decoder core 120 or the decoder core 320 or the decoder core 430 or the decoder core 530) as:

$$\tilde{x}(n)=x(n)+\delta(n) \quad (1)$$

where x(n) is the input to the encoder (e.g., to the audio encoder 410, 510) and δ(n) is the quantization noise. The quantization noise δ(n) is correlated to the input speech since ACELP uses perceptual models during the quantization process. This correlation property of the quantization noise makes our post-filtering problem unique to speech enhancement problem which assumes the noise to be uncorrelated. In order to reduce the quantization noise, we estimate a real valued mask per time-frequency bin and multiply this mask with that of magnitude of the coded speech for that time-frequency bin.

$$|\hat{X}(k,n)|=M(k,n)*|\tilde{X}(k,n)| \quad (2)$$

where M(k,n) is the real valued mask, $\tilde{X}(k,n)$ is magnitude of the coded speech, $\hat{X}(k,n)$ is the magnitude of enhanced speech, k is the frequency index and n is the time index. If our mask is ideal (e.g., if the scaling values M(k,n) are ideal), we can reconstruct the clean speech from coded speech.

$$|X(k,n)|=IRM(k,n)*|\tilde{X}(k,n)| \quad (3)$$

where |X(k,n)| is the magnitude of the clean speech.

Comparing the Eq. 2 and 3, we obtain the ideal ratio mask (IRM) (e.g., an ideal value of the scaling values M (k,n)) and is given by $$IRM(k,n) = \frac{|X(k,n)|}{|\tilde{X}(k,n)|+\gamma} \quad (4)$$

where γ is very small constant factor to prevent division by zero. Since the magnitude values lies in the range [0, ∞], the values of IRM also lie in the range [0, ∞].

Worded yet differently, for example, an enhanced audio representation $\hat{X}(k,n)$ can be derived on the basis of the decoded audio $\tilde{X}(k,n)$ using a scaling, wherein scaling factors may be described by M(k,n). Also, for example, the scaling factors M(k,n) can be derived from the decoded audio representation since there is typically a correlation between a noise (which is at least partially compensated by the scaling using the scaling factors M(k,n)) and the decoded audio representation $\tilde{X}(k,n)$. For example, a scaling as given in Equation (2) can be performed by the scaling 138, wherein the scaling value determination 134 may, for example, provide scaling values M(k,n), which will approximate ideal scaling vectors IRM(k,n) as described, for example, by Equation (4).

Thus, it is desirable that the scaling value determination 134 determines scaling values which approximate IRM(k,n).

This can, for example, be achieved by an appropriate design of the scaling value determination 134 or of the scaling value determination 334, wherein, for example, the coefficients of the machine-learning structure or neural network used to implement the block 380 may be determined as outlined in the following.

6.1.2 MMSE Optimizations

For example, two different types of minimum mean square error (MMSE) optimization can be used to train the neural network (e.g., the neural network 380): mask approximation (MA) (e.g., as shown in FIG. 4) and signal approximation (SA) [10] (e.g., as shown in FIG. 5). MA optimization approach tries to minimize the mean square error (MSE) between the target mask (e.g., target scaling values) and estimated mask (e.g., scaling values 484 provided by the neural network).

$$MSE_{MA}=\Sigma_{n=0}^{N-1}\Sigma_{k=0}^{K-1}(IRM(k,n)-M(k,n))^2 \quad (5)$$

where IRM(k,n) is the target mask, M(k,n) is the estimated mask.

SA optimization approach tries to minimize the mean square error (MSE) between the target magnitude spectrum |X(k,n| (e.g., a magnitude spectrum of the training audio representation 510) and enhanced magnitude spectrum |$\hat{X}$(k,n)| (e.g., a magnitude spectrum of the enhanced audio representation 592).

$$MSE_{SA}=\Sigma_{n=0}^{N-1}\Sigma_{k=0}^{K-1}(|X(k,n|-|\hat{X}(k,n)|)^2 \quad (6)$$

where the enhanced magnitude spectrum is given by Eq. 2

Worded yet differently, the neural network used in the scaling value determination 134 or in the scaling value determination 334 can be trained, for example, as shown in FIGS. 4 and 5. As can be seen from FIG. 4, the neural net training/machine-learning training 490 optimizes the neural net coefficients or machine-learning structure coefficients 482 in accordance with the criterion defined in Equation (5).

As shown in FIG. 5, the neural net training/machine-learning training 596 optimizes the neural net coefficients/machine-learning structure coefficients 594 in accordance with the criterion shown in Equation (6).

6.1.3 Analysis of Mask Values

In most of the proposed mask based approaches for speech enhancement and dereverberation, the mask values are bounded to one [9] [10]. This is because, conventionally, if the mask values are not bounded to one, estimation errors might cause the amplification of noise or musical tones [15]. Hence, these approaches use sigmoid as output activations in order to bound the mask values to 1.

Table 1 shows the percentage of mask values that lie that lie in interval (0,1) for different signal to noise ratio (SNR). These mask values were computed by adding white noise at different SNR's to clean speech. We can infer from the table 1, that majority of the mask values lie in the interval [0,1] and hence the bounding to the mask values to 1 has no adverse effect on neural network based speech enhancement systems.

We then computed the distribution of mask values at lower three bitrates (6.65 kbps, 8.85 kbps and 12.65 kbps) of AMR-WB. Table 2 shows the computed distribution. One major difference with table 1 is the percentage of mask values that lie in the range [0,1]. While 39% of values lie in this range at 6.65 kbps, at 12.65 kbps, this value increases to 44%. Almost 30-36% of mask values lie in the range of [1,2]. Almost 95% of the mask values lie in the range [0,5]. Hence, for post-filtering problem, we cannot simply bound the mask value to 1. This prevents us from using sigmoid activations (or simple, non-scaled sigmoid activations) at the output layer.

In other words, it has been found that it is advantageous to use mask values (also designated as scaling values) which are larger than one in the embodiments according to the invention. Also, it has been found that it is advantageous to limit the mask values or scaling values to a predetermined value, which should be larger than one, and which may, for example, be in a region between 1 and 10 or in a region between 1.5 and 10. By limiting the mask value or scaling value, an excessive scaling, which might result in artifacts, can be avoided. For example, an appropriate range of scale values can be achieved by using a scaled sigmoid activation in an output layer of the neural network, or by using a (for example, rectified) limited linear activation function as an output layer of the neural network.

6.2 Experimental Setup

In the following, some details regarding an experimental setup will be described. However, it should be noted that the features functionalities and details described herein can optionally be taken over into any of the embodiments disclosed herein.

Our proposed post-filter computes short time Fourier transform (SIFT) of frames with length 16 ms with 50% overlap (8 ms) at 16 kHz sampling rate (e.g., in block 324). The time frames are windowed with hann window before fast Fourier transform (FFT) of length 256 was computed resulting in 129 frequency bins (e.g., spatial domain representation 326). From the FFT, log magnitude values are computed in order to compress the very high dynamic range of magnitude values (e.g., logorithmized absolute values 372). Since speech has temporal dependency, we used context frames around the processed time frame (e.g., designated with 373). We tested our proposed model in two conditions: a) only past context frames were used and b) both past and future context frames were used. This was done because the future context frames adds to the delay of the proposed post-filter and we wanted to test the benefit of using the future context frames. The context window of 3 was chosen for our experiments leading of delay of just one frame (16 ms) when only past context frames was considered. When both past and future context frames were considered, the delay of the proposed post-filter was 4 frames (64 ms).

The input feature dimension (e.g., of values 373 and 373) to our proposed neural network when tested with only past 3 context frames and current processed frame was 516 (4*129). When tested with both past and future context frames, the input feature dimension was 903 (7*129). The input features (e.g., values 372 and 373) were normalized to zero mean and unit variance. However, the target, either the real valued mask (e.g., values 494) or magnitude spectrum of uncoded speech (e.g., the magnitude of values 410) was not normalized.

FIG. 6 shows FCNN 600 that is trained to learn the mapping function $f_\theta$ between the log-magnitude and real valued mask.

$$M(k,n) = f_\theta(\log_{10}(\tilde{X}(k,n))) \tag{7}$$

An FCNN is a simple neural network that has an input layer 610, one or more hidden layers 612a to 612d and an output layer 614. We implemented the FCNN in python with Keras [16] and used Tensorflow [17] as backend. In our experiments, we have used 4 hidden layers with 2048 units. All the 4 hidden layers used Rectified linear units (ReLU) as activation functions [18]. The output of hidden layers were normalized using batch normalization [19]. In order to prevent overfitting, we set the dropout [20] to 0.2. To train our FCNN, we used Adam optimizer [21] with learning rate 0.01 and the batch size used was 32.

The dimension of the output layer 614 was 129. Since our FCNN estimates rel valued (or real valued) mask and these masks can any value between [0, ∞], we tested with both bounding the mask values and no bounding. When the mask values were unbounded, we used ReLU activation in our output layer. When the mask values were bounded, we either used bounded ReLU activation or sigmoid function and scaled the output of sigmoid activation by a certain scaling factor N.

To train our FCNN, we used the two loss functions ($MSE_{MA}$ and $MSE_{SA}$) as defined in sec 6.1.2 Clip norm was used in order to ensure the convergence of the model when bounded ReLU or unbounded ReLU was used as output layer activation.

The gradients at the output layer when bounded or unbounded ReLU is used is:

$$\frac{\partial E}{\partial W} = (\text{tar} - \text{out}) \times 1 \times h \tag{8}$$

where tar is either magnitude spectrum (e.g., the magnitude of audio representation 510) or IRM (e.g., values 494), out is either enhanced magnitude (e.g., values 542) or estimated mask (e.g., values 484) which takes in any value between 0 and threshold and h is the output of a hidden unit which is given as input to the output unit. When bounded ReLU is used, equ 8 is zero beyond the bounded value.

The gradients at the output layer when scaled sigmoid is used is:

$$\frac{\partial E}{\partial W} = (\text{tar} - \text{out}) * N * M_{est} * M_{est} * (1 - M_{est}) * h \tag{9}$$

where tar is either magnitude spectrum or IRM (e.g., values 494), out is either enhanced magnitude or estimated mask $M_{est}$ which takes in any value between 0 and 1 and h is the output of a hidden unit which is given as input to the output unit.

For our training, validation and testing we used the NTT database [22]. We also performed cross-database testing on TIMIT database [23] to confirm the model's independence on training database. Both NTT and TIMIT databases are clean speech database. TIMIT database consists of mono speech files at 16 kHz sampling rate. NTT database consists of stereo speech files sampled at 48 kHz. In order to obtain mono speech files at 16 kHz, we performed passive downmix and resampling on NTT database. NTT database consists of 3960 files, out of which 3612 files were used for training, 198 files were used for validation and 150 files were used for testing. The NT database consists of both male and female speakers and also consists of languages such as American and British English, German, Chinese, French and Japanese.

The time domain enhanced speech was obtained using inverse short time Fourier transform (iSTFT). iSTFT made use of phase of the coded speech without any processing.

To conclude, a fully connected neural network 600 as shown in FIG. 6 is used in embodiments according to the invention to implement the scaling value determination 134 or the neural net 380. Also, the neural net 600 may be trained by the apparatus 200 or by the apparatus 400 or by the apparatus 500.

As can be seen, the neural net 600 receives logarithmized magnitude values (for example, logarithmized absolute values of spectral values 132, 372, 472, 572) in its input layer 610. For example, logarithmized absolute values of spectral values of a currently processed frame and of one or more preceding frames and of one or more subsequent frames may be received at the input layer 610. The input layer may, for example, receive the logarithmized absolute values of spectral values. The values received by the input layer may then be forwarded, in a scaled manner, to the artificial neurons of the first hidden layers 612a. The scaling of the input values of the input layer 612 may, for example, be defined by the set of values defining characteristics of the filter. Subsequently, the artificial neurons of the first hidden layer 612, which may be implemented using non-linear functions, provide output values of the first hidden layer 612a. The output values of the first hidden layer 612a are then provided, in a scaled manner, to the inputs of the artificial neurons of the subsequent (second) hidden layer 612b. Again, the scaling is defined by the set of values defining the characteristics of the filter. Additional hidden layers comprising a similar functionality may be included. Finally, the output signals of the last hidden layer (for example, of the fourth hidden layer 612d) are provided, in a scaled manner, to the inputs of the artificial neurons of the output layer 614. The functionality of the artificial neurons of the output layer 614 may, for example, be defined by an output layer activation function. Accordingly, the output values of the neural net may be determined using an evaluation of the output layer activation function.

Furthermore, it should be noted that the neural network may be "fully connected" which means, for example, that all input signals of the neural network may contribute to input signals of all artificial neurons of the first hidden layer and that output signals of all artificial neurons of a given hidden layer may contribute to the input signals of all artificial neurons of a subsequent hidden layer. However, the actual contributions may be determined by the set of values defining characteristics of the filter, which is typically determined by the neural network training 490, 596.

Moreover, it should be noted that the neural network training 490, 596 may, for example, use the gradients as provided in Equations (8) and (9) when determining the coefficients of the neural network.

It should be noted that any of the features, functionalities and details described in this section may optionally be introduced into any of the embodiments disclosed herein, both individually and taken in combination.

6.3 Experiments and Results

In order to estimate the bound of the mask values, we con-ducted an oracle experiment. In this, we estimated the IRM and bounded the IRM with different threshold values as shown in FIG. 7. We used objective measures such as perceptual evaluation of speech quality (PESQ) [24] [25] [26] and perceptual objective listening quality assessment (POLQA)[27] for our evaluation. From FIG. 7 it can be inferred that setting the threshold to 1 do not perform as good as setting the threshold values to 2, 4 or 10. There are very minute differences between threshold values 2, 4 and 10. Hence, we chose to bound our mask values to 2 in further experiments.

Moreover, FIG. 8 shows average PESQ and POLQA scores evaluating the performance of proposed methods and EVS post-processor. It can be seen that the application of the concepts described herein results in an improvement of a speech quality, both for the case that signal approximation (for example, as shown in FIG. 5) and masked approximation (for example, as shown in FIG. 4) is used for the training of the artificial neural network.

7. Conclusions

It has been found that the quality of coded speech suffers greatly at lower bit-rates due to high quantization noise. Post-filters are usually employed at low bit-rates in order to mitigate the effect of the quantization noise. In this disclosure, we propose a real valued mask based post-filter in order to enhance the quality of de-coded speech at lower bitrates. To estimate this real valued mask, we employ, for example, a fully connected neural network that operates on normalized log-magnitudes. We tested our proposal on adaptive multi-rate wideband (AMR-WB) codec at lower 3 modes (6.65 kbps, 8.85 kbps and 12.65 kbps). Our experiment shows improvement in PESQ, POLQA and subjective listening tests.

In other words, embodiments according to the invention are related to a concept which uses a fully connected network in the context of speech coding and/or speech decoding.

Embodiments according to the invention are related to coded speech enhancement. Embodiments according to the invention are related to a post-filtering. Embodiments according to the invention are related to a concept which deals with quantization noise (or, more precisely, with a reduction of quantization noise).

In embodiments according to the invention, a CNN (convolutional neural network) is used as a mapping function in a cepstral domain. [14] proposed a statistical context based post-filter in a log-magnitude domain.

In this contribution, we formulate the problem of enhancing the coded speech as a regression problem. A fully connected neural network (FCNN) is trained to learn the mapping function $f_\theta$ between the input (log-magnitude) and output (real valued mask). The estimated real valued mask is then multiplied with the input magnitude in order to enhance the coded speech. We evaluated our contribution on the AMR-WB codec at bitrates 6.65 kbps, 8.85 kbps and 12.65 kbps. In embodiments, the post-filter can be used in EVS [4][3] as our reference post-filter. For further details, reference is made to sections 6.1 and 6.2. As can be seen, verbal listening test results are provided. For example, a favorable PESQ and POLQA scores can be achieved using embodiments according to the invention.

In the following, some additional important points will be described.

According to a first aspect, a mask-based post-filter to enhance the quality of the coded speech is used in embodiments according to the invention.

a. The mask is real valued (or the scaling values are real-valued). It is estimated for each frequency bin by a machine-learning algorithm (or by a neural network) from the input features b. $\hat{X}(k,n) = M_{est}(k,n) * \tilde{X}(k,n)$ c. Where $M_{est}(k,n)$ is the estimated mask, $\tilde{X}(k,n)$ is the magnitude value of coded speech and $\hat{X}(k,n)$ is the post-processed speech at frequency bin k and time index n d. The input features used currently are log magnitude spectrum but can also be any derivative of magnitude spectrum.

According to a second aspect, there may optionally be a limitation of mask values or scaling values.

The estimated mask values lie, for example, in the range $[0,\infty]$. In order to prevent such a large range, a threshold can optionally be set. In traditional speech enhancement algorithms, the mask is bounded to 1. In contrast we bound it to a threshold value that is greater than 1. This threshold value is determined by analyzing the mask distribution. Useful threshold values may, for example, lie anywhere between 2 to 10.

a. Since the estimated mask values are, for example, bounded to a threshold and since the threshold valued is greater than 1, output layer can either be bounded rectified linear units ReLU or scaled sigmoid.
b. When the machine learning algorithm is optimized using mask approximation MMSE (minimum mean square estimation optimization) method, the target mask (e.g. the target scaling values) can optionally be modified by either setting the mask values (e.g. the target scaling values) above the threshold in the target mask to 1 or can be set to threshold.

According to a third aspect, the machine-learning algorithm may be used as a fully connected neural network. A long short-term memory (LSTM) can also be used as an alternative.
a. The fully connected neural network consists of, for example, 4 hidden layers. Each hidden layer, for example, consists of 2048 or 2500 rectified linear units (ReLU) activations.
b. The input dimension of the fully connected neural network is dependent on the context frames and size of FFT. The delay of the system is also dependent on the context frames and frame size.
c. The size of the context frames can, for example, be anywhere between 3 and 5. For our experiments, we used, for example, 256 (16 ms@16 kHz) as frame size and FFT size. The size of the context frames were set to 3 since there was very small benefit when going beyond 3. We also tested with both future+past context frames and only past context frames.

According to a fourth aspect, the fully connected network was trained with following MMSE (minimum mean square estimation optimization): Mask Approximation and Signal Approximation.
a. In mask approximation, mean square error between the target mask (e.g. the target scaling values) and estimated mask (e.g. scaling values scaling values determined using the neural net) is minimized. The target mask is modified, for example, as in (2.b) (e.g. in Aspect 2, subsection b).
b. In signal approximation, mean square error between the enhanced magnitude (e.g. the enhanced magnitude spectrum 592) and target magnitude (e.g. a magnitude spectrum of the audio representation 510) is minimized. The enhanced magnitude is obtained by multiplying the estimated mask from DNN (e.g. from the neural network) with that of coded magnitude. The target magnitude is the uncoded speech magnitude.

To conclude, the embodiments described herein can optionally be supplemented by any of the important points or aspects described here. However, it should be noted that the important points and aspects described here can either be used individually or in combination and can be introduced into any of the embodiments described herein, both individually and in combination.

8. Method According to FIG. 9

FIG. 9 shows a block schematic diagram of a method 900 for providing an enhanced audio representation on the basis of an encoded audio representation, according to an embodiment of the present invention.

The method comprises providing 910 a decoded audio representation ($\tilde{X}(k,n)$).

Moreover, the method comprises 920 obtaining a plurality of scaling values ($M(k,n)$), which are associated with different frequency bins or frequency ranges, on the basis of spectral values of the decoded audio representation which are associated with different frequency bins or frequency ranges, and the method comprises scaling 930 spectral values of the decoded audio signal representation ($\tilde{X}(k,n)$), or a pre-processed version thereof, using the scaling values ($M(k,n)$), to obtain the enhanced audio representation ($\hat{X}(k,n)$).

The method 900 can optionally be supplemented by any of the features, functionalities and details described herein, both individually and in combination.

9. Method According to FIG. 10

FIG. 10 shows a block schematic diagram of a method 1000 for determining a set of values defining characteristics of a filter for providing an enhanced audio representation ($\hat{X}(k,n)$) on the basis of a decoded audio representation, according to an embodiment of the present invention.

The method comprises obtaining 1010 spectral values ($|\tilde{X}(k,n)|$) of the decoded audio representation, which are associated with different frequency bins or frequency ranges.

The method also comprises determining 1020 the set of values defining the characteristics of the filter, such that scaling values provided by the filter on the basis of the spectral values of the decoded audio representation, which are associated with different frequency bins or frequency ranges, approximate target scaling values.

Alternatively, the method comprises determining 1030 the set of values defining the characteristics of the filter such that a spectrum obtained by the filter on the basis of the spectral values of the decoded audio representation, which are associated with different frequency bins or frequency ranges and using scaling values obtained on the basis of the decoded audio representation approximates a target spectrum.

10. Implementation Alternatives

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

The inventive encoded audio signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The apparatus described herein may be implemented using a hardware apparatus, or using a computer, or using a combination of a hardware apparatus and a computer.

The apparatus described herein, or any components of the apparatus described herein, may be implemented at least partially in hardware and/or in software.

The methods described herein may be performed using a hardware apparatus, or using a computer, or using a combination of a hardware apparatus and a computer.

The methods described herein, or any components of the apparatus described herein, may be performed at least partially by hardware and/or by software.

While this invention has been described in terms of several advantageous embodiments, there are alterations, permutations, and equivalents, which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

11. References

[1] 3GPP, "Speech codec speech processing functions; Adaptive Multi-Rate—Wideband (AMR-WB) speech codec; Transcoding functions," 3rd Generation Partnership Project (3GPP), TS 26.190, December 2009. [Online]. Available: http://www.3gpp.org/ftp/Specs/html-info/26190.htm

[2] M. Dietz, M. Multrus, V. Eksler, V. Malenovsky, E. Norvell, H. Pobloth, L. Miao, Z. Wang, L. Laaksonen, A. Vasilache, Y. Ka-mamoto, K. Kikuiri, S. Ragot, J. Faure, H. Ehara, V. Rajendran, V. Atti, H. Sung, E. Oh, H. Yuan, and C. Zhu, "Overview of the EVS codec architecture." IEEE, 2015, pp. 5698-5702.

[3] 3GPP, "TS 26.445, EVS Codec Detailed Algorithmic Description; 3GPP Technical Specification (Release 12)," 3rd Generation Partnership Project (3GPP), TS 26.445, December 2014. [Online]. Available: http://www.3gpp org/ftp/Specs/html-info/26445 htm

[4] T. Vaillancourt, R. Salami, and M. Jelnek, "New post-processing techniques for low bit rate celp codecs," in *ICASSP*, 2015.

[5] J.-H. Chen and A. Gersho, "Adaptive postfiltering for quality en-hancement of coded speech," vol. 3, no. 1, pp. 59-71, 1995.

[6] T. Bäckström, Speech Coding with Code-Excited Linear Prediction. Springer, 2017. [Online]. Available: http://www.springer.com/gp/book/9783319502021

[7] K. Han, Y. Wang, D. Wang, W. S. Woods, I. Merks, and T. Zhang, "Learning spectral mapping for speech dereverberation and de-noising."

[8] Y. Zhao, D. Wang, I. Merks, and T. Zhang, "Dnn-based enhance-ment of noisy and reverberant speech," in 2016 *IEEE International Conference on Acoustics, Speech and Signal Processing (ICASSP)*, 2016.

[9] Y. Wang, A. Narayanan, and D. Wang, "On training targets for supervised speech separation," *IEEE/ACM Transactions on Au-dio, Speech, and Language Processing*, vol. 22, pp. 1849-1858, 2014.

[10] F. Weninger, J. R. Hershey, J. L. Roux, and B. Schuller, "Dis-criminatively trained recurrent neural networks for single-channel speech separation," in *IEEE Global Conference on Signal and Information Processing (GlobalSIP)*, 2014.

[11] D. S. Williamson and D. Wang, "Time-frequency masking in the complex domain for speech dereverberation and denoising."

[12] Z. Zhao, S. Elshamy, H. Liu, and T. Fingscheidt, "A cnn postpro-cessor to enhance coded speech," in 16*th International Workshop on Acoustic Signal Enhancement (IWAENC)*, 2018.

[13] Z. Zhao, H. Liu, and T. Fingscheidt, "Convolutional neural net-works to enhance coded speech," *IEEE/ACM Transactions on Au-dio, Speech, and Language Processing*, vol. 27, no. 4, pp. 663-678, April 2019.

[14] S. Das and T. Bäckström, "Postfiltering using log-magnitude spectrum for speech and audio coding," in *Proc. Inter-speech* 2018, 2018, pp. 3543-3547. [Online]. Available: http://dx.doi.org/10.21437/Interspeech.2018-1027

[15] W. Mack, S. Chakrabarty, F.-R. Stöter, S. Braun, B. Edler, and E. Habets, "Single-channel dereverberation using direct mmse optimization and bidirectional lstm networks," in *Proc. Interspeech 2018*, 2018, pp. 1314-1318. [Online]. Available: http://dx.doi.org/10.21437/Interspeech.2018-1296

[16] F. Chollet et al., "Keras," https://keras.io, 2015.

[17] M. Abadi, A. Agarwal, P. Barham, E. Brevdo, Z. Chen, C. Citro, G. S. Corrado, A. Davis, J. Dean, M. Devin, S. Ghemawat, I. Goodfellow, A. Harp, G. Irving, M. Isard, Y. Jia, R. Jozefowicz, L. Kaiser, M. Kudlur, J. Levenberg, D. Mane', R. Monga, S. Moore, D. Murray, C. Olah, M. Schuster, J. Shlens, B. Steiner, I. Sutskever, K. Talwar, P. Tucker, V. Vanhoucke, V. Vasudevan, F. Vie'gas, O. Vinyals, P. Warden, M. Wattenberg, M. Wicke, Y. Yu, and X. Zheng, "TensorFlow: Large-scale machine learning on heterogeneous systems," 2015, software available from tensorflow.org. [Online]. Available: http://tensorflow.org/

[18] X. Glorot, A. Bordes, and Y. Bengio, "Deep sparse rectifier neural networks," in ˆ *International Conference on Artificial Intelligence and Statistics,* 2011, p. 315323.

[19] S. Ioffe and C. Szegedy, "Batch normalization: Accelerating deep network training by reducing internal covariate shift," in *International Conference on Machine Learning*, vol. 37, 2015, pp. 448-456.

[20] N. Srivastava, G. Hinton, A. Krizhevsky, I. Sutskever, and R. Salakhutdinov, "Dropout: A simple way to prevent neural networks from overfitting," *J. Mach. Learn. Res.*, vol. 15, no. 1, pp. 1929-1958, January 2014. [Online]. Available: http://dl.acm.org/citation.cfm?id=2627435.2670313

[21] D. Kingma and J. Ba, "Adam: A method for stochastic optimiza-tion," in *arXiv preprint arXiv*:1412.6980, 2014.

[22] NTT-AT, "Super wideband stereo speech database," http://www.ntt-at.com/product/widebandspeech, accessed: Sep. 9, 2014. [Online]. Available: http://www.ntt-at.com/product/widebandspeech

[23] J. S. Garofolo, L. D. Consortium et aL, *TIMIT: acoustic-phonetic continuous speech corpus*. Linguistic Data Consortium, 1993.

[24] A. Rix, J. Beerends, M. Hollier, and A. Hekstra, "Perceptual eval-uation of speech quality (pesq)—a new method for speech quality assessment of telephone networks and codecs," in 2001 *IEEE International Conference on Acoustics, Speech and Signal Process-ing (ICASSP)*, 2001.

[25] ITU-T, "P.862.1: Mapping Function for Transforming P.862 Raw Result Scores to MOS-LQO," (International Telecommunication Union), Tech. Rep. P.862.1, November 2003.

[26] _____, "P.862.2: Wideband Extension to Recommendation P.862 for the Assessment of Wideband Telephone Networks and Speech Codecs," (International Telecommunication Union), Tech. Rep. P.862.2, November 2005.

[27] *Perceptual objective listening quality assessment (POLQA)*, ITU-T Recommendation P.863, 2011. [Online]. Available: http://www.itu.int/rec/T-REC-P.863/en

[28] Recommendation BS.1534, *Method for the subjective assessment of intermediate quality levels of coding systems*, ITU-R, 2003.

The invention claimed is:

1. An audio decoder for providing a decoded audio representation on the basis of an encoded audio representation,
wherein the audio decoder comprises a filter for providing an enhanced audio representation of the decoded audio representation,
wherein the filter is configured to acquire a plurality of scaling values, which are associated with different frequency bins or frequency ranges, on the basis of spectral values of the decoded audio representation which are associated with different frequency bins or frequency ranges, and
wherein the filter is configured to scale spectral values of the decoded audio signal representation, or a preprocessed version thereof, using the scaling values, to acquire the enhanced audio representation;
wherein the filter comprises a Neural network or a machine learning structure configured to provide the scaling values on the basis of a plurality of spectral values describing the decoded audio representation, spectral values which are associated with different frequency bins or frequency ranges;
wherein the filter is configured to normalize input features of the neural network or of the machine learning structure to a predetermined mean value and/or to a predetermined variance or standard deviation.

2. The audio decoder according to claim 1,
wherein the filter is adapted to use a configurable processing structure, a configuration of which is based on a machine learning algorithm, in order to provide the scaling values.

3. The audio decoder according to claim 1,
wherein the filter is configured to determine the scaling values solely on the basis of the spectral values of the decoded audio representation in a plurality of frequency bins or frequency ranges.

4. The audio decoder according to claim 1,
wherein the filter is configured to acquire magnitude values $|\hat{X}(k,n)|$ of the enhanced audio representation according to $$|\hat{X}(k,n)|=M(k,n)*|\tilde{X}(k,n)|,$$

wherein $M(k,n)$ is a scaling value,
wherein k is a frequency index,
wherein n is a time index,
wherein $|\tilde{X}(k,n)|$ is a magnitude value of a spectral value of decoded audio representation; or
wherein the filter is configured to acquire values $\hat{X}(k,n)$ of the enhanced audio representation according to $$\hat{X}(k,n)=M(k,n)*\tilde{X}(k,n),$$

wherein $M(k,n)$ is a scaling value,
wherein k is a frequency index,
wherein n is a time index,
wherein $\tilde{X}(k,n)$ is a spectral value of the decoded audio representation.

5. The audio decoder according to claim 1,
wherein the filter is configured to acquire the scaling values such that the scaling values cause a scaling or an amplification for one or more spectral values of the decoded audio signal representation, or for one or more preprocessed spectral values which are based on the spectral values of decoded audio signal representation.

6. The audio decoder according to claim 1,
wherein input signals of the Neural network or of the machine learning structure represent the logarithmic magnitudes, amplitude or norm of spectral values of the decoded audio representation, spectral values which are associated with different frequency bins or frequency ranges.

7. The audio decoder according to claim 1,
wherein output signals of the Neural network or of the machine learning structure represent the scaling values.

8. The audio decoder according to claim 1,
wherein the neural network or the machine learning structure is trained to limit, to reduce or to minimize a deviation between a plurality of target scaling values and a plurality of scaling values acquired using the neural network or using the machine learning structure.

9. The audio decoder according to claim 1,
wherein the neural network or the machine learning structure is trained to limit, to reduce or to minimize a deviation between a target magnitude spectrum, a target amplitude spectrum, a target absolute spectrum or a target norm spectrum and a magnitude spectrum, a amplitude spectrum, an absolute spectrum or a norm spectrum acquired using a scaling of a processed spectrum which uses scaling values that are provided by the neural net or by the machine learning structure.

10. The audio decoder according to claim 1,
wherein the neural network or the machine learning structure is trained such that a scaling for one or more spectral values of the spectral decomposition of the decoded audio signal representation, or for one or more preprocessed spectral values which are based on the spectral values of the spectral decomposition of the decoded audio signal representation, lies within a range between 0 and a predetermined maximum value.

11. The audio decoder according to claim 10 wherein the maximum value is greater than 1.

12. The audio decoder according to claim 1,
wherein the neural network or the machine learning structure is trained such that the scaling for one or more spectral values of the spectral decomposition of the decoded audio signal representation, or for one or more preprocessed spectral values which are based on the spectral values of the spectral decomposition of the decoded audio signal representation, is limited to 2, or is limited to 5, or is limited to 10, or is limited to a predetermined value greater than 1.

13. The audio decoder according to claim 1,
wherein the neural network or the machine learning structure is trained such that the scaling values are limited to 2, or are limited to 5, or are limited to 10, or are limited to a predetermined value greater than 1.

14. The audio decoder according to claim 1,
wherein a number of input features of the neural network or of the machine learning structure is larger, at least by a factor of 2, than a number of output values of the neural network or of the machine learning structure.

15. The audio decoder according to claim 1,
wherein a neural net comprises an input layer, one or more hidden layers and an output layer.

16. The audio decoder according to claim 15,
wherein the one or more hidden layers use rectified linear units as activation functions.

17. The audio decoder according to claim 15,
wherein the output layer uses rectified linear units or bounded rectified linear units or sigmoid functions as activation functions.

18. The audio decoder according to claim 1,
wherein the filter is configured to acquire short term Fourier transform coefficients which represent the spectral values of the decoded audio representation, which are associated with different frequency bins or frequency ranges.

19. The audio decoder according to claim 1,
wherein the filter is configured to derive logarithmic magnitude, amplitude, absolute or norm values and to determine the scaling values on the basis of the logarithmic magnitude, amplitude, absolute or norm values.

20. The audio decoder according to claim 1,
wherein the filter is configured to determine a plurality of scaling values associated with a current frame on the basis of spectral values of the decoded audio representation, which are associated with different frequency bins or frequency ranges, of the current frame, and on the basis of spectral values of the decoded audio representation, which are associated with different frequency bins or frequency ranges, of one or more frames preceding the current frame.

21. The audio decoder according to claim 1,
wherein the filter is configured to determine a plurality of scaling values associated with a current frame on the basis of spectral values of the decoded audio representation, which are associated with different frequency bins or frequency ranges, of one or more frames following the current frame.

22. A method for providing an enhanced audio representation on the basis of an encoded audio representation,
wherein the method comprises providing a decoded audio representation of the encoded audio representation,
wherein the method comprises acquiring a plurality of scaling values, which are associated with different frequency bins or frequency ranges, on the basis of spectral values of the decoded audio representation which are associated with different frequency bins or frequency ranges, and wherein the method comprises scaling spectral values of the decoded audio signal representation, or a pre-processed version thereof, using the scaling values, to acquire the enhanced audio representation;
wherein the method comprises using a Neural network or a machine learning to provide the scaling values on the basis of a plurality of spectral values describing the decoded audio representation, spectral values which are associated with different frequency bins or frequency ranges;
wherein the method comprises normalizing input features of the neural network or of the machine learning to a predetermined mean value and/or to a predetermined variance or standard deviation.

23. A non-transitory digital storage medium having a computer program stored thereon to perform the method according to claim 22 when said computer program is run by a computer.

24. An audio decoder for providing a decoded audio representation on the basis of an encoded audio representation,
wherein the audio decoder comprises a filter for providing an enhanced audio representation of the decoded audio representation,
wherein the filter is configured to acquire a plurality of scaling values, which are associated with different frequency bins or frequency ranges, on the basis of spectral values of the decoded audio representation which are associated with different frequency bins or frequency ranges, and
wherein the filter is configured to scale spectral values of the decoded audio signal representation, or a pre-processed version thereof, using the scaling values, to acquire the enhanced audio representation;
wherein the filter is configured to determine a plurality of scaling values associated with a current frame on the basis of spectral values of the decoded audio representation, which are associated with different frequency bins or frequency ranges, of one or more frames following the current frame.

25. A method for providing an enhanced audio representation on the basis of an encoded audio representation,
    wherein the method comprises providing a decoded audio representation of the encoded audio representation,
    wherein the method comprises acquiring a plurality of scaling values, which are associated with different frequency bins or frequency ranges, on the basis of spectral values of the decoded audio representation which are associated with different frequency bins or frequency ranges, and
    wherein the method comprises scaling spectral values of the decoded audio signal representation, or a pre-processed version thereof, using the scaling values, to acquire the enhanced audio representation;
    wherein a plurality of scaling values associated with a current frame are determined on the basis of spectral values of the decoded audio representation, which are associated with different frequency bins or frequency ranges, of one or more frames following the current frame.

26. A non-transitory digital storage medium having a computer program stored thereon to perform the method according to claim 25 when said computer program is run by a computer.

* * * * *